United States Patent
Katayama et al.

(10) Patent No.: US 7,844,765 B2
(45) Date of Patent: Nov. 30, 2010

(54) KVM SWITCH AND METHOD FOR CONTROLLING THE SAME

(75) Inventors: Shinichi Katayama, Shinagawa-ku (JP); Hideki Onishi, Shinagawa-ku (JP); Fujio Seki, legal representative, Shinagawa-ku (JP); Naoyuki Nagao, Shinagawa-ku (JP)

(73) Assignee: Fujitsu Component Limited, Tokyo (JP)

( * ) Notice: Subject to any disclaimer, the term of this patent is extended or adjusted under 35 U.S.C. 154(b) by 216 days.

(21) Appl. No.: 12/230,114

(22) Filed: Aug. 22, 2008

(65) Prior Publication Data

US 2009/0055559 A1 Feb. 26, 2009

(30) Foreign Application Priority Data

Aug. 24, 2007 (JP) ............................. 2007-219074

(51) Int. Cl.
*G06F 13/12* (2006.01)
(52) U.S. Cl. ............................. 710/68; 710/62; 710/65; 710/69
(58) Field of Classification Search ........................ None
See application file for complete search history.

(56) References Cited

U.S. PATENT DOCUMENTS

| 7,006,695 | B2 * | 2/2006 | Yamada ...................... 382/232 |
| 2002/0072892 | A1 | 6/2002 | Shirley |
| 2004/0062305 | A1 | 4/2004 | Dambrackas |
| 2004/0189598 | A1 | 9/2004 | Fujita et al. |
| 2005/0105608 | A1* | 5/2005 | Coleman et al. ....... 375/240.01 |
| 2005/0246433 | A1 | 11/2005 | Carrigan et al. |
| 2007/0150818 | A1 | 6/2007 | Liu |
| 2009/0116552 | A1* | 5/2009 | Dambrackas .......... 375/240.08 |
| 2010/0011355 | A1* | 1/2010 | Carrigan et al. ................ 718/1 |

FOREIGN PATENT DOCUMENTS

| JP | 59-54394 | 3/1984 |
| JP | 9-34244 | 2/1997 |
| JP | 2006-340300 | 12/2006 |
| WO | 2006/023173 | 3/2006 |

OTHER PUBLICATIONS

"UltraMatrix Remote" obtained from Website of Rose Electronics. (http://www.rose.com/htm/ultramatrixremote.htm) (pp. 1-3); and (http://www.rose.com/datasheet/ultramatrixremote.pdf) (1 pg).
Extended European Search Report in Appln. No. 08162542.8 dated Apr. 22, 1010.

* cited by examiner

*Primary Examiner*—Eron J Sorrell
(74) *Attorney, Agent, or Firm*—Staas & Halsey LLP

(57) ABSTRACT

A KVM switch is connected to a server, and a client via a network. The KVM switch includes: a signal processing portion that receives an analog image signal corresponding to screen data displayed on a display device of the client from the server, executes analog/digital conversion to the analog image signal, and stores a converted digital image signal as the screen data into a memory; a detecting portion that, when new screen data is stored, detects data corresponding to a changing part of the new screen data to screen data that has already been stored into the memory; a thinning-out portion that thins out the detected data corresponding to the changing part; and a transmitting and receiving portion that transmits data corresponding to the changing part after the thinning-out to the client, and receives operation data from an input device connected to the client.

20 Claims, 25 Drawing Sheets

FIG. 22

| X-COORDINATE OF CHANGING AREA: x (2byte) | Y-COORDINATE OF CHANGING AREA: y (2byte) | NUMBER OF PIECES OF HORIZONTAL DATA OF CHANGING AREA: w (2byte) | NUMBER OF PIECES OF VERTICAL DATA OF CHANGING AREA: h (2byte) |
|---|---|---|---|
| ENCODE TYPE (4byte) | DIVISION RATE: n (1byte) | TRANSMISSION LINE: l (1byte) | THINNING-OUT FORM: m (1byte) |
| SCREEN DATA: data (SIZE FOR TRANSMISSION SCREEN DATA) | | | |

FIG. 24

| PERMISSIBLE BAND (bw) | TRANSMISSION INTERVAL OF PACKET |
|---|---|
| 0<bw(Mbps)≦1 | 200ms |
| 1<bw(Mbps)≦2 | 150ms |
| 2<bw(Mbps)≦3 | 100ms |
| 3<bw(Mbps)≦4 | 50ms |
| ⋮ | ⋮ |

FIG. 25

| PERMISSIBLE BAND (bw) | DIVISION RATE (n) |
|---|---|
| $0 < bw(Mbps) \leq 1$ | 5 |
| $1 < bw(Mbps) \leq 2$ | 4 |
| $2 < bw(Mbps) \leq 3$ | 3 |
| $3 < bw(Mbps) \leq 4$ | 2 |
| ⋮ | ⋮ |

KVM SWITCH AND METHOD FOR CONTROLLING THE SAME

BACKGROUND OF THE INVENTION

1. Field of the Invention

The present invention relates to a KVM switch which is directly connected to a server and connected to a client via a network, as well as a method for controlling the same, and in particular to a KVM switch which causes a display device connected to the client to display an image signal output from the server, as well as a method for controlling the same.

2. Description of the Related Art

Conventionally, there has been known a KVM (K:keyboard, V:video, M:mouse) switch which is connected between a plurality of computers and peripheral devices such as a mouse, a keyboard, and a monitor (see e.g. U.S. Pat. No. 6,567,869).

Conventionally, there has been known a KVM switch which is connected to a plurality of servers and peripheral devices such as the mouse, the keyboard, and the monitor, and is connected to a client which is a remote terminal via a network (See e.g. Rose Electronics Ltd., products name "UltraMatrix Remote".

In a server-client system including the KVM switch, an image from the server is displayed on a monitor connected to the client via the KVM switch and the network.

Further, conventionally, there have been known a signal processing apparatus which thins out pixels like a checkered pattern to decrease data to be compressed, and achieves compression and extension processing of an image with high speed and low cost (see. Japanese Laid-Open Patent Publication No. 2006-340300), a recording device which sets a thinning-out rate of dots, and records an image on a sheet by the set thinning-out rate (see. Japanese Laid-Open Patent Publication No. 09-34244), a television system in which a signal transmission side divides image information into two pieces of field information comprised of odd number scanning lines and even number scanning lines and transmits them to a signal reception side, and the signal reception side synthesizes two pieces of received field information to create image information of one frame (see. Japanese Laid-Open Patent Publication No. 59-54394).

However, when the image data always changes like a moving image in the above-mentioned server-client system, the image data for all screen area is transmitted from the server to the client via the KVM switch and the network.

Therefore, it takes time to transmit the image data from the server to the client. Moreover, the communication band of the network is occupied by the transmission of the image data from the server to the client, so that processing to transmit operation data of an input device connected to the client to the server is delayed.

Further, even if the image data transmitted from the server to the client is thinned out, it might still take time to transmit the image data. As a result, processing to transmit operation data of an input device connected to the client to the server is delayed.

SUMMARY OF THE INVENTION

It is an object of the present invention to provide a KVM switch and a method for controlling the same which can reduce an amount of screen data transmitted from a server to a client, and can increase chances to receive operation data from an input device connected to the client.

According to a first aspect of the present invention, there is provided a KVM switch connected to a server, and a client via a network, comprising: a signal processing portion that receives an analog image signal corresponding to screen data displayed on a display device of the client from the server, executes analog/digital conversion to the analog image signal, and stores a converted digital image signal as the screen data into a memory; a detecting portion that, when new screen data is stored into the memory, detects data corresponding to a changing part of the new screen data to screen data that has already been stored into the memory; a thinning-out portion that thins out the detected data corresponding to the changing part of the new screen data; and a transmitting and receiving portion that transmits data corresponding to the changing part of the new screen data after the thinning-out to the client, and receives operation data from an input device connected to the client.

With the above arrangement, only when there is a change of the screen data, the screen data is transmitted from the server to the client, and further the screen data corresponds to the changing part and is thinned out. As a result, it is possible to reduce an amount of the screen data transmitted from the server to the client. The amount of the screen data transmitted from the server to the client is reduced, so that the number of times that can transmit a packet of the operation data from the input device connected to the client increases. Therefore, it is possible to increase chances to receive the operation data from the input device connected to the client.

Preferably, the thinning-out portion includes a setting portion that sets a value of a permissible band on the network and a thinning-out method of the data corresponding to the changing part of the new screen data, which are used for data transmission to the client.

With the above arrangement, it is possible to adjust an amount of the screen data transmitted from the server to the client. Moreover, it is possible to adjust the increase and decrease of chances to receive the operation data from the input device connected to the client.

More preferably, the thinning-out method of the data corresponding to the changing part of the new screen data includes an amount of the thinning-out and a thinning-out form of the data corresponding to the changing part of the new screen data.

With the above arrangement, it is possible to set the amount of the thinning-out and the thinning-out form of the data corresponding to the changing part of the new screen data.

Still more preferably, the thinning-out form is any one of a checkered pattern, a vertical stripe, and a horizontal stripe.

With the above arrangement, it is possible to thin out the data corresponding to the changing part of the new screen data by any one of the checkered pattern, the vertical stripe, and the horizontal stripe. Moreover, it is possible to reduce the time required when the user of the client understands the whole of the change in the screen data.

More preferably, the thinning-out portion controls a transmission interval of the data corresponding to the changing part of the new screen data so that a transfer rate of the data corresponding to the changing part of the new screen data is accommodated in the value of the permissible band on the network set by the setting portion.

With the above arrangement, a communication band on the network used for the transfer of the screen data of the changing part is limited to the value of the permissible band set by the setting portion, and hence all of the communication band on the network is not occupied by the transmission of the image data from the server to the client as in the prior art.

Therefore, it is possible to secure chances to receive the operation data from the input device connected to the client.

More preferably, the thinning-out portion controls the thinning-out method of the data corresponding to the changing part of the new screen data so that a transfer rate of the data corresponding to the changing part of the new screen data is accommodated in the value of the permissible band on the network set by the setting portion.

With the above arrangement, a communication band on the network used for the transfer of the screen data of the changing part is limited to the value of the permissible band set by the setting portion, and hence all of the communication band on the network is not occupied by the transmission of the image data from the server to the client as in the prior art. Therefore, it is possible to secure chances to receive the operation data from the input device connected to the client.

More preferably, the transmitting and receiving portion includes a transmitting portion that receives the operation data from the input device connected to the client and transmits the operation data to the server, by using a communication band on the network other than the permissible band on the network set by the setting portion.

With the above arrangement, the data communication between the client and the server can be done more efficiently than the prior art.

Preferably, the KVM switch further comprises a storing portion that temporarily stores data of a part thinned-out by the thinning-out portion, wherein the transmitting and receiving portion transmits the data corresponding to the changing part after the thinning-out to the client, and then transmits the data of the thinned-out part stored into the storing portion to the client.

With the above arrangement, all data corresponding to the changing part of the screen data can be transmitted, and displayed on the display device of the client.

Preferably, the transmitting and receiving portion transmits to the client the data corresponding to the changing part after the thinning-out, and information showing a display position and a display size on the display device of the data corresponding to the changing part after the thinning-out, and a thinning-out form and an amount of the thinning-out of the data corresponding to the changing part after the thinning-out.

With the above arrangement, the client can display the data corresponding to the changing part after the thinning-out at an appropriate position and size, based on the information showing a display position and a display size on the display device of the data corresponding to the changing part after the thinning-out, and a thinning-out form and an amount of the thinning-out of the data corresponding to the changing part after the thinning-out.

Preferably, the signal processing portion receives the analog image signal corresponding to screen data displayed on the display device of the client from the server, thins out the received analog image signal based on predesignated thinning-out information, executes analog/digital conversion to the thinned-out analog image signal, and stores a thinned-out and converted digital image signal as the screen data into the memory, and the transmitting and receiving portion transmits the screen data stored into the memory to the client.

With the above arrangement, it is possible to transmit the screen data to the client without executing a thinning-out process by the thinning-out portion.

According to a second aspect of the present invention, there is provided a method for controlling a KVM switch connected to a server, and a client via a network, comprising: a signal processing step that receives an analog image signal corresponding to screen data displayed on a display device of the client from the server, executes analog/digital conversion to the analog image signal, and stores a converted digital image signal as the screen data into a memory; a detecting step that, when new screen data is stored into the memory, detects data corresponding to a changing part of the new screen data to screen data that has already been stored into the memory; a thinning-out step that thins out the detected data corresponding to the changing part of the new screen data; and a transmitting and receiving step that transmits data corresponding to the changing part of the new screen data after the thinning-out to the client, and receives operation data from an input device connected to the client.

With the above arrangement, only when there is a change of the screen data, the screen data is transmitted from the server to the client, and further the screen data corresponds to the changing part and is thinned out. As a result, it is possible to reduce an amount of the screen data transmitted from the server to the client. The amount of the screen data transmitted from the server to the client is reduced, so that the number of times that can transmit a packet of the operation data from the input device connected to the client increases. Therefore, it is possible to increase chances to receive the operation data from the input device connected to the client.

Preferably, the thinning-out step includes a setting step that sets a value of a permissible band on the network and a thinning-out method of the data corresponding to the changing part of the new screen data, which are used for data transmission to the client.

With the above arrangement, it is possible to adjust an amount of the screen data transmitted from the server to the client. Moreover, it is possible to adjust the increase and decrease of chances to receive the operation data from the input device connected to the client.

More preferably, the thinning-out method of the data corresponding to the changing part of the new screen data includes an amount of the thinning-out and a thinning-out form of the data corresponding to the changing part of the new screen data.

With the above arrangement, it is possible to set the amount of the thinning-out and the thinning-out form of the data corresponding to the changing part of the new screen data.

Still more preferably, the thinning-out form is any one of a checkered pattern, a vertical stripe, and a horizontal stripe.

With the above arrangement, it is possible to thin out the data corresponding to the changing part of the new screen data by any one of the checkered pattern, the vertical stripe, and the horizontal stripe. Moreover, it is possible to reduce the time required when the user of the client understands the whole of the change in the screen data.

More preferably, the thinning-out step controls a transmission interval of the data corresponding to the changing part of the new screen data so that a transfer rate of the data corresponding to the changing part of the new screen data is accommodated in the value of the permissible band on the network set in the setting step.

With the above arrangement, a communication band on the network used for the transfer of the screen data of the changing part is limited to the value of the permissible band set in the setting step, and hence all of the communication band on the network is not occupied by the transmission of the image data from the server to the client as in the prior art. Therefore, it is possible to secure chances to receive the operation data from the input device connected to the client.

More preferably, the thinning-out step controls the thinning-out method of the data corresponding to the changing part of the new screen data so that a transfer rate of the data corresponding to the changing part of the new screen data is accommodated in the value of the permissible band on the network set in the setting step.

With the above arrangement, a communication band on the network used for the transfer of the screen data of the changing part is limited to the value of the permissible band set in the setting step, and hence all of the communication band on the network is not occupied by the transmission of the image data from the server to the client as in the prior art. Therefore, it is possible to secure chances to receive the operation data from the input device connected to the client.

More preferably, the transmitting and receiving step includes a transmitting step that receives the operation data from the input device connected to the client and transmits the operation data to the server, by using a communication band on the network other than the permissible band on the network set in the setting step.

With the above arrangement, the data communication between the client and the server can be done more efficiently than the prior art.

Preferably, the method for controlling the KVM switch further comprises a storing step that temporarily stores data of a part thinned-out in the thinning-out step into the memory, wherein the transmitting and receiving step transmits the data corresponding to the changing part after the thinning-out to the client, and then transmits the data of the thinned-out part stored into the memory to the client.

With the above arrangement, all data corresponding to the changing part of the screen data can be transmitted, and displayed on the display device of the client.

Preferably, the transmitting and receiving step transmits to the client the data corresponding to the changing part after the thinning-out, and information showing a display position and a display size on the display device of the data corresponding to the changing part after the thinning-out, and a thinning-out form and an amount of the thinning-out of the data corresponding to the changing part after the thinning-out.

With the above arrangement, the client can display the data corresponding to the changing part after the thinning-out at an appropriate position and size, based on the information showing a display position and a display size on the display device of the data corresponding to the changing part after the thinning-out, and a thinning-out form and an amount of the thinning-out of the data corresponding to the changing part after the thinning-out.

Preferably, the signal processing step receives the analog image signal corresponding to screen data displayed on the display device of the client from the server, thins out the received analog image signal based on predesignated thinning-out information, executes analog/digital conversion to the thinned-out analog image signal, and stores a thinned-out and converted digital image signal as the screen data into the memory, and the transmitting and receiving step transmits the screen data stored into the memory to the client.

With the above arrangement, it is possible to transmit the screen data to the client without executing a thinning-out process in the thinning-out step.

BRIEF DESCRIPTION OF THE DRAWINGS

Preferred embodiments of the present invention will be described in detail with reference to the following drawings, wherein:

FIG. 22 is a diagram showing a format of the transmission packet indicative of the screen data of the changing area;

FIG. 24 is a diagram showing an example of table data for deciding a transmission interval of a packet; and FIG. 25 is a diagram showing an example of table data for deciding the division rate (n), the transmission line (l), and the thinning-out form (m).

DESCRIPTION OF THE PREFERRED EMBODIMENTS

A description will now be given, with reference to the accompanying drawings, of an embodiment of the present invention.

Figure 1:
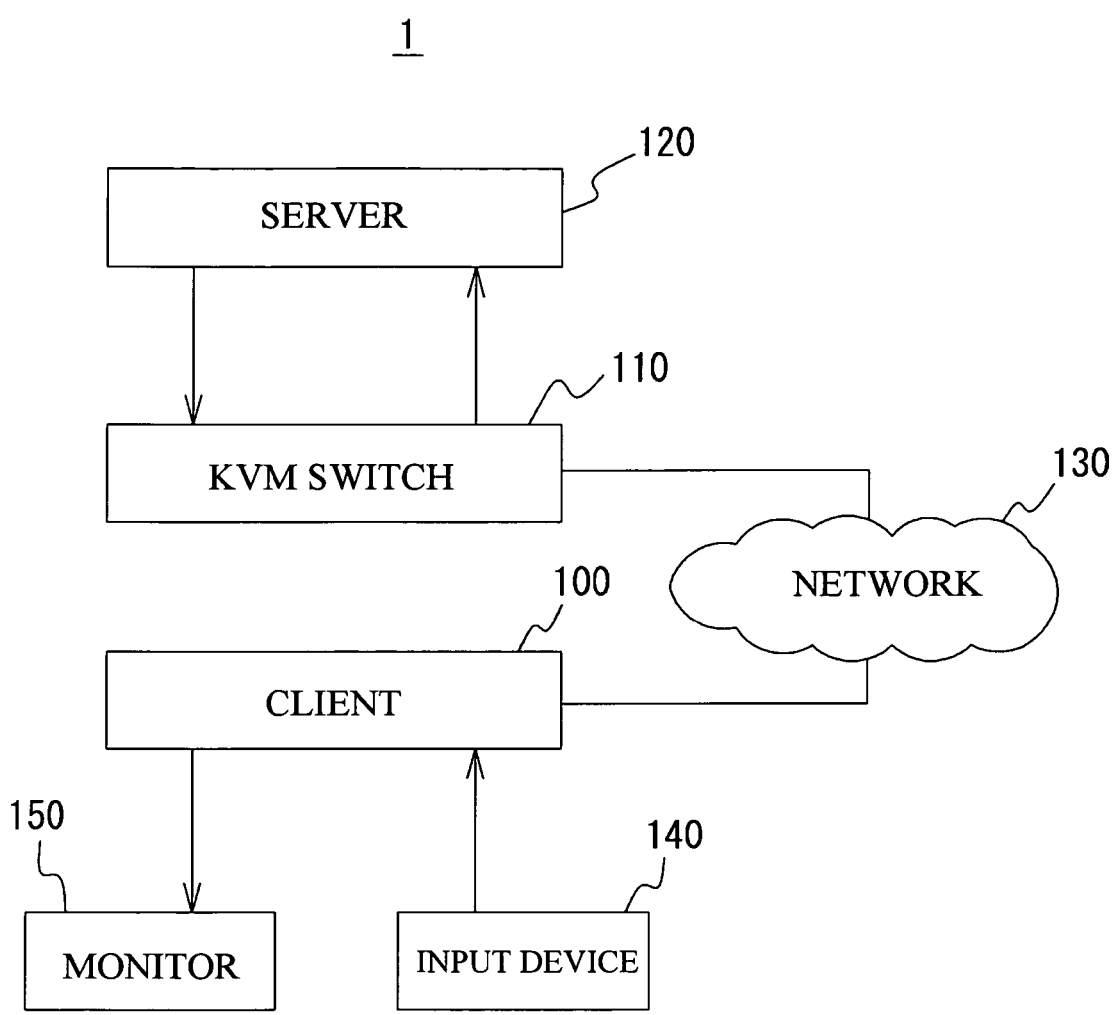
FIG. 1 is a block diagram showing the construction of a server-client system including a KVM switch according to an embodiment of the present invention.

FIG. 1 is a block diagram showing the construction of a server-client system including a KVM switch (K:keyboard, V:video, M:mouse) according to an embodiment of the present invention.

As shown in FIG. 1, a server-client system 1 includes a client 100 connected to a input device 140 and a monitor 150, a server 120, and a KVM switch 110 connected to the server 120, and to the client 100 via a network 130. The client 100 and the server 120 are composed of computers, and the input device 140 is composed of a keyboard, a mouse, and so on.

When a user operates the input device 140, operation data is transmitted from the client 100 to the server 120 via the network 130 and the KVM switch 110. Moreover, screen data from the server 120 is transmitted to the client 100 via the network 130 and the KVM switch 110, and is displayed on the monitor 150.

Figure 2:
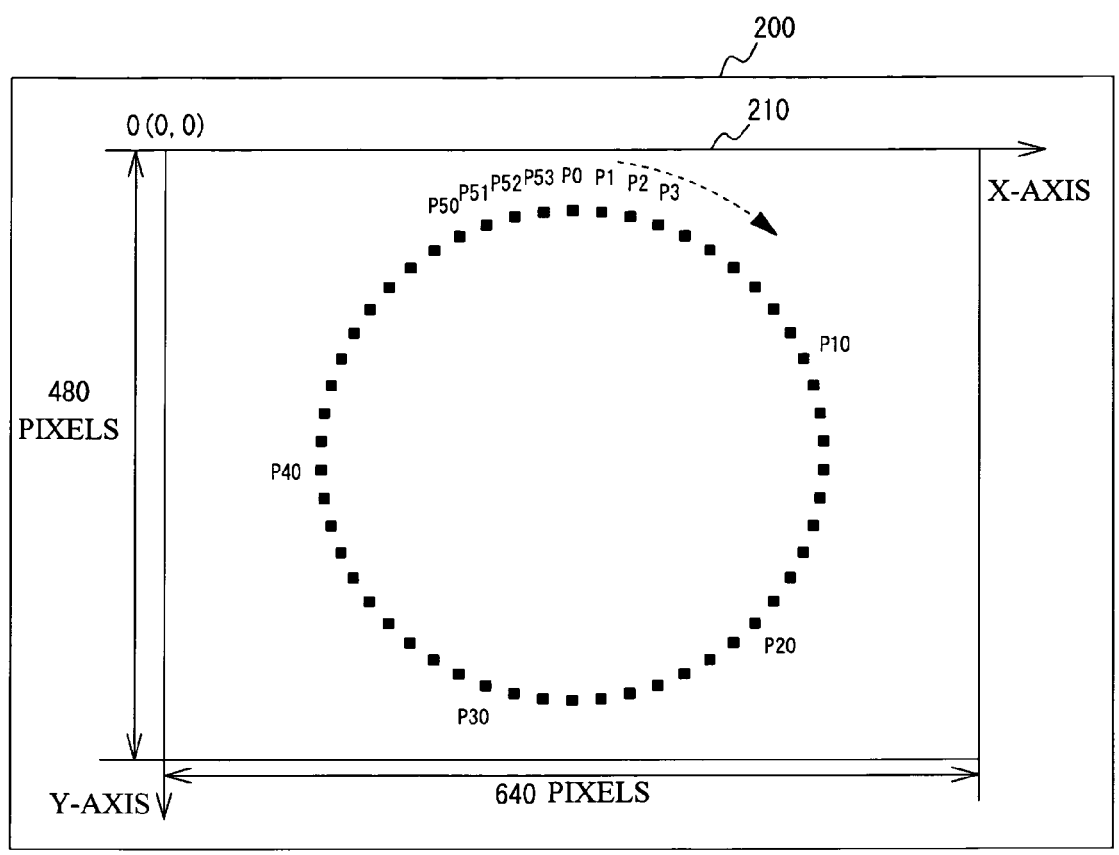
FIG. 2 is a diagram showing a display screen of a monitor in FIG. 1.

FIG. 2 is a diagram showing a display screen of the monitor 150.

An image display area 210 which displays the screen data from the server 120 is displayed on a display screen 200 of the monitor 150. The size of the image display area 210 is 480×640 pixels.

Here, operation is referred to by way of example, in which the user operates the mouse as the input device 140. Assuming that a point P0 in FIG. 2 is a start point, the user operates the mouse so as to turn along points P0 to P53 sequentially at time intervals of 20 ms in the clockwise direction.

Further, it is assumed that some changes always occur in the screen data from the server 120 displayed on the image display area 210. It is assumed that a communication band available for the transmission and reception of the screen data and the operation data is 10 Mbps in the network 130.

When the color of one pixel is shown in the form of BGR233, the time required for the transmission of the screen data for the image display area 210 is as follows:

$$640*480[byte]*8[bit/byte]/(1024*1024*10)[bit/s]$$
$$\approx 0.234[s]=234[ms]$$

When an original point "O", an X-axis and a Y-axis are set as shown in FIG. 2, the operation data is shown by coordinates of a pixel value. Since the input device 140 is the mouse, the operation data is data of 5 bytes in total which adds 1 byte to the coordinates of the pixel value as button information.

In this case, the time required for the transmission of the operation data is as follows:

$$5[byte]*8[bit/byte]/(1024*1024*10)[bit/s]\approx 3.81*10^{-6}$$
$$[s]=3.81\ [\mu s]$$

Figure 3:
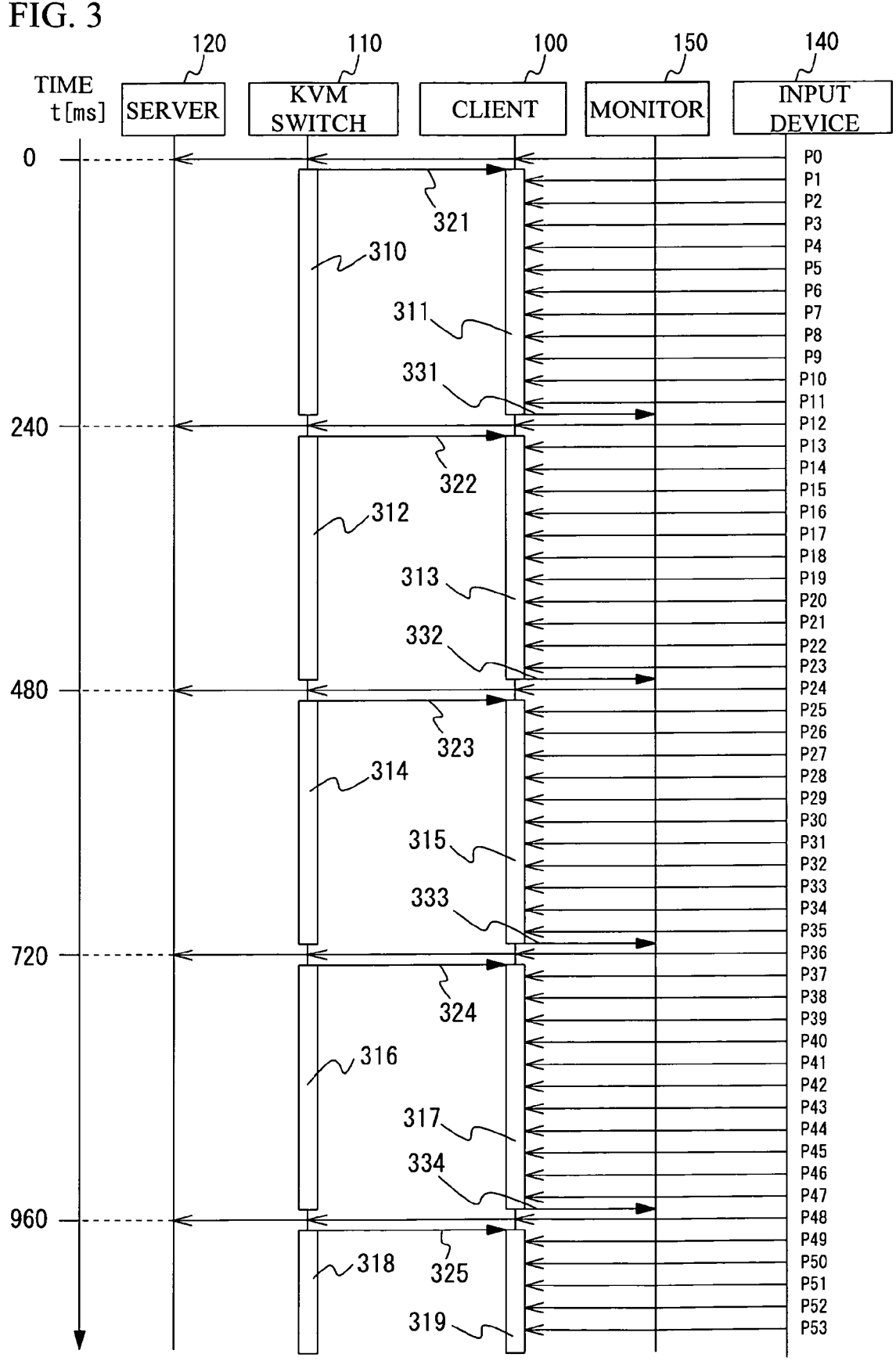
FIG. 3 is a block diagram showing a movement sequence of the server-client system when mouse operation is executed in FIG. 2.

FIG. 3 is a block diagram showing a movement sequence of the server-client system when mouse operation is executed in FIG. 2.

In the input device 140 in FIG. 3, movement operation from the point P0 to the point P53 occurs at time intervals of 20 ms, and a front edge of leftward arrow signs which expand from the points P0 to P53 shows a destination of the operation data.

When the KVM switch 110 receives the operation data, the KVM switch 110 converts the operation data into data of the input device 140, and outputs the data of the input device 140 to the server 120. It is assumed that a time period when the KVM switch 110 converts the operation data into the data of the input device 140 and a time period when the KVM switch 110 outputs the data of the input device 140 to the server 120 are negligibly short time periods.

Rightward arrows 321 to 325 show that the KVM switch 110 begins to transmit the screen data of the server 120 to the client 100 via the network 130. Rectangles 310 to 319 show time periods requested until transmission and reception of the screen data is completed. Since the communication band on the network 130 is used to transmit and receive the screen data during these time periods, the operation data of the input device 140 cannot be notified to the KVM switch 110.

The client 100 which has received the screen data converts the screen data into a signal which can be displayed on the monitor 150, and outputs the signal to the monitor 150. The converted signal is displayed on the monitor 150. It is assumed that a time period requested for converting the screen data into the signal which can be display on the monitor 150, a time period requested for outputting the signal to the monitor 150, and a time period requested until display of the signal is completed are negligibly short time periods.

In a sequence in FIG. 3, timing when the operation data is notified to the server 120 is 5 points of the point P0 (t=0[ms]), the point P12 (t=240[ms]), the point P24 (t=480[ms]), the point P36 (t=720[ms]), and the point P48 (t=960[ms]) in total.

Figure 4:
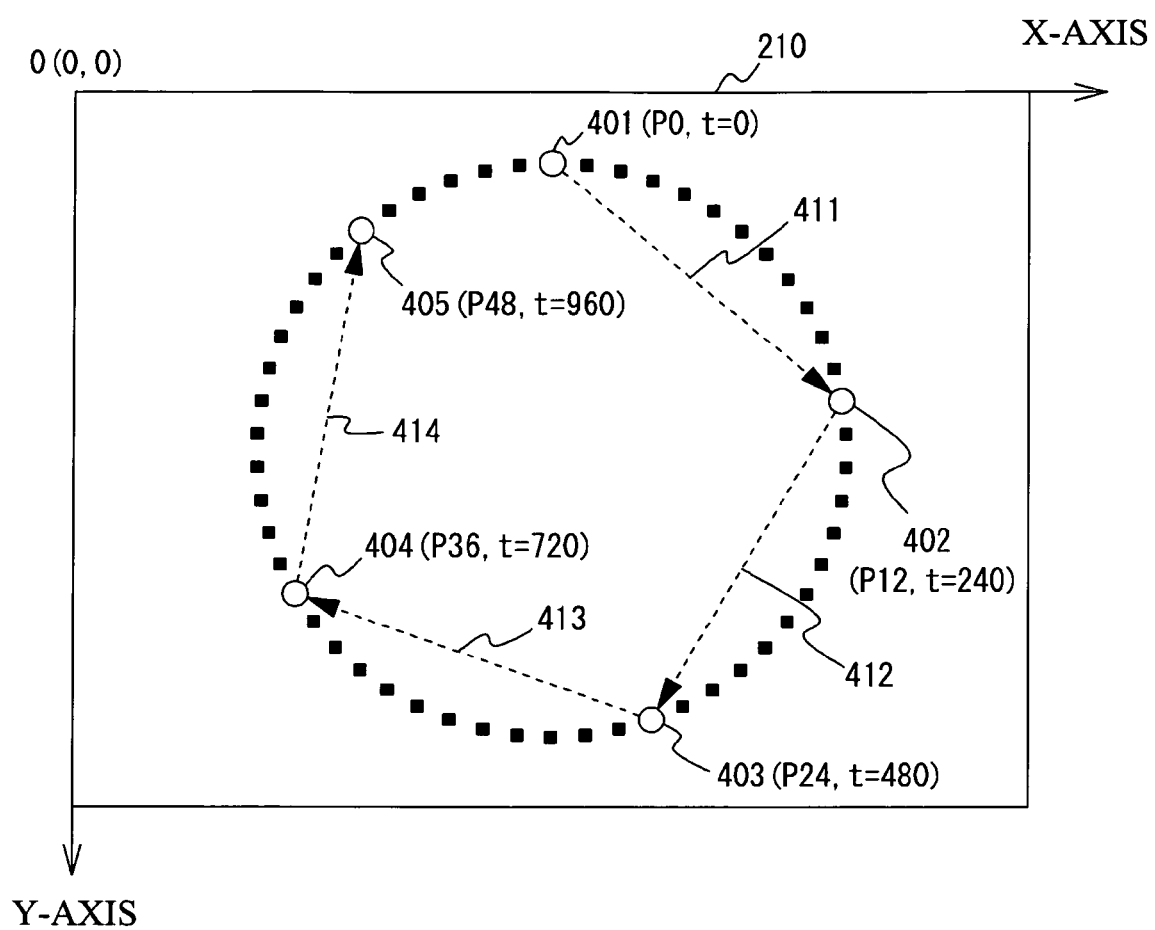
FIG. 4 is a diagram showing timing in which operation data is notified to a server on an image display area.

FIG. 4 is a diagram showing timing in which operation data is notified to the server 120 on the image display area 210.

Circular marks 401 to 405 shows the positions of the points P0, P12, P24, P36, and P48, respectively. Broken-line arrows 411 to 414 shows tracks of the mouse cursor notified to the server 120.

Although the operation of the input device shows operation which draws a circle along from the point P0 to the point P53 shown in FIG. 2, the operation notified to the server 120 is in a state of a pentagon shown in the broken-line arrows 411 to 414 of FIG. 4.

Therefore, the input device is operated in a manner that divides image data into two, i.e., odd number steps and even number steps of the Y-axis in the image display area, and transmits them.

The time required for transmitting the screen data corresponding to a half of a screen area on the network 130 is as follows:

$$640*240[\text{byte}]*8[\text{bit/byte}]/(1024*1024*10)[\text{bit/s}]$$
$$\approx 0.117[s]=117[ms]$$

Figure 5:
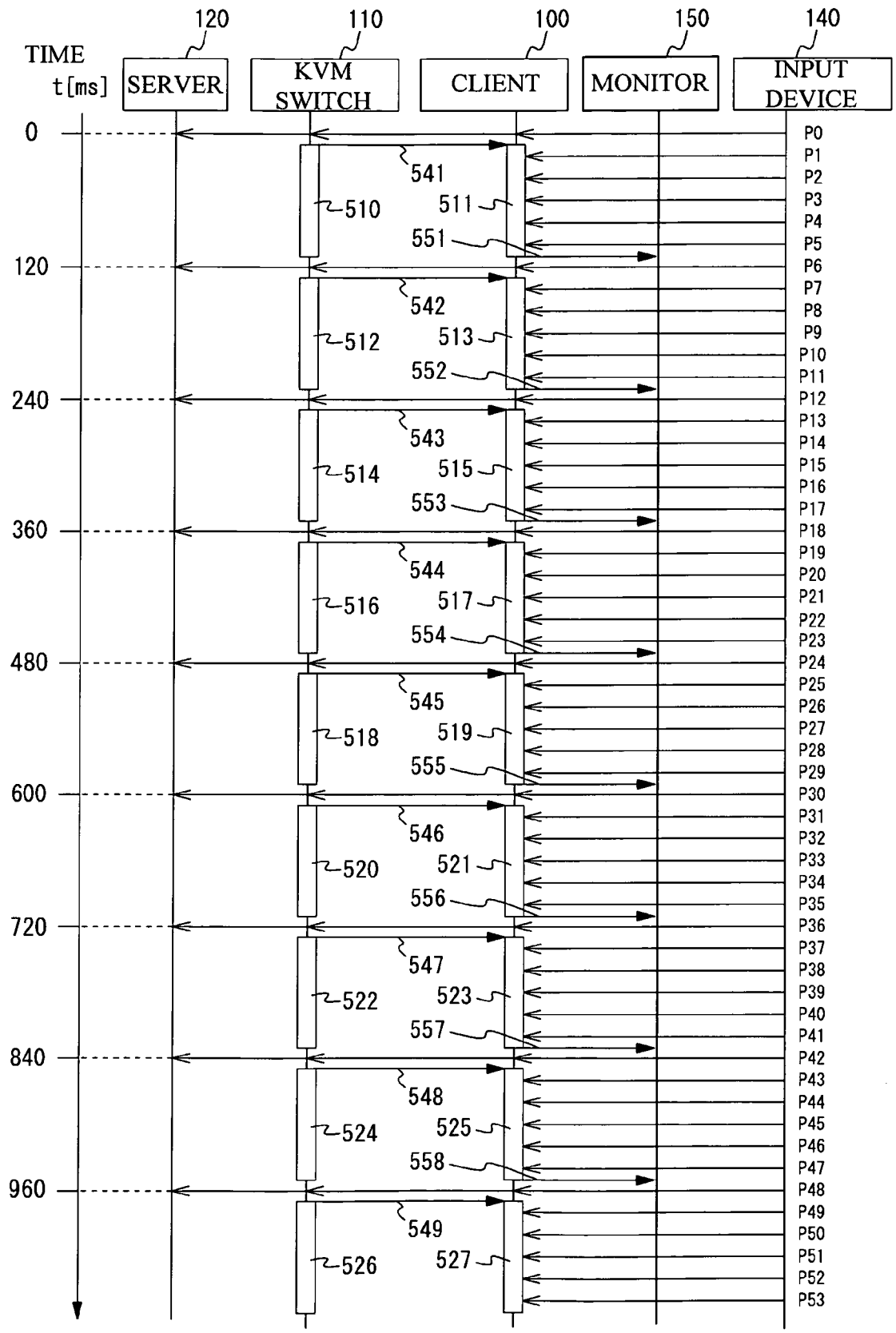
FIG. 5 is a diagram showing a sequence when an input device is operated in a manner that divides image data into two, i.e., odd number steps and even number steps of a Y-axis in the image display area, and transmits them.

FIG. 5 is a diagram showing a sequence when the input device 140 is operated in a manner that divides image data into two, i.e., odd number steps and even number steps of the Y-axis in the image display area, and transmits them.

Similarly to FIG. 3, in the input device 140 in FIG. 3, movement operation from the point P0 to the point P53 occurs at time intervals of 20 ms, and a front edge of leftward arrow signs which expand from the points P0 to P53 shows a destination of the operation data. Rightward arrows 541 to 549 show that the KVM switch 110 begins to transmit the screen data of the server 120 to the client 100 via the network 130.

The rightward arrows 541, 543, 545, 547, and 549 show that the KVM switch 110 begins to transmit the screen data of lines where the Y-axis in the image display area 210 becomes even number, and the rightward arrows 542, 544, 546, and 548 show that the KVM switch 110 begins to transmit the screen data of lines where the Y-axis in the image display area 210 becomes odd number.

Rectangles 510 to 527 show time periods requested until transmission and reception of the screen data corresponding to the half of the image display area 210 is completed. Since the communication band on the network 130 is used to transmit and receive the screen data during these time periods, the operation data of the input device 140 cannot be notified to the KVM switch 110.

In a sequence in FIG. 5, timing when the operation data is notified to the server 120 is 9 points of the point P0 (t=0[ms]), the point P6 (t=120[ms]), the point P12 (t=240[ms]), the point P18 (t=360[ms]), the point P24 (t=480[ms]), the point P30 (t=600[ms]), the point P36 (t=720[ms]), the point P42 (t=840[ms]), and the point P48 (t=960[ms]) in total.

Figure 6:
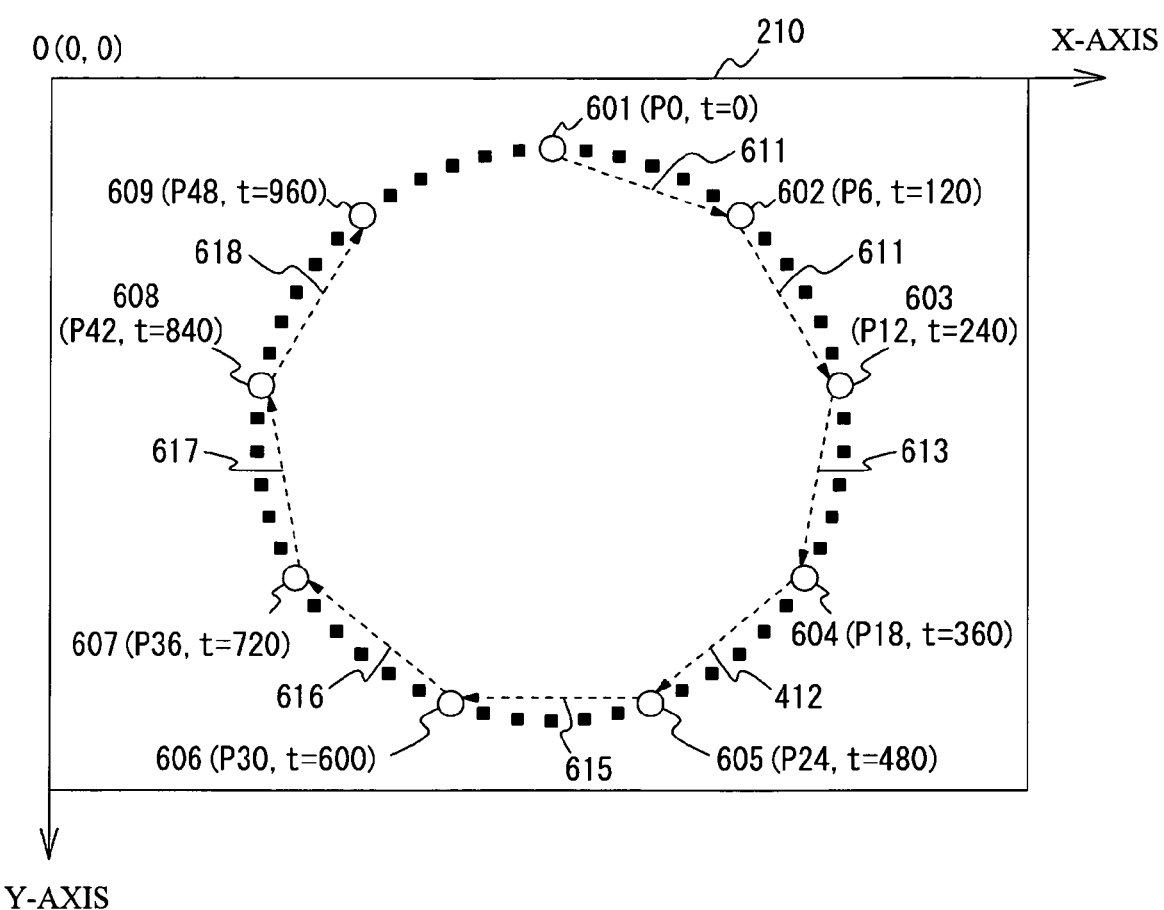
FIG. 6 is a diagram showing timing in which operation data is notified to the server on the image display area.

FIG. 6 is a diagram showing timing in which operation data is notified to the server on the image display area.

Circular marks 601 to 609 shows the positions of the points P0, P6, P12, P18, P24, P30, P36, P42 and P48, respectively. Broken-line arrows 611 to 618 shows tracks of the mouse cursor notified to the server 120.

Although the operation of the input device shows operation which draws a circle along from the point P0 to the point P53 shown in FIG. 2, the operation notified to the server 120 is in a state of an enneagon shown in the broken-line arrows 611 to 618 of FIG. 6. However, if the state of the enneagon shown in the broken-line arrows 611 to 618 of FIG. 6 and the state of the pentagon shown in the broken-line arrows 411 to 414 of FIG. 4 are compared with each other, the former becomes a form like a circle which reflects the real operation state.

Next, a description will now be given of a display state of the image display area 210 when the KVM switch 110 limits an amount of data transmitted from the server 120 to the client 100.

For example, when the KVM switch 110 limits the amount of data transmitted from the server 120 to the client 100 to an amount of data corresponding to the half of the image display area 210, in a conventional method, the screen data of lines where the Y-axis in the image display area 210 corresponds to values of 0 to 239 is first transmitted, and then the screen data of remaining lines where the Y-axis in the image display area 210 corresponds to values of 240 to 480 is transmitted.

A sequence in this case is the same as the sequence in FIG. 5. The timing in which the operation data is notified to the server 120 is the same as the timing in FIG. 6. This transmission method of the screen data is different in the screen data displayed on the monitor 150 from the method in which the KVM switch 110 divides the screen data transmitted from the server 120 to the client 100 into two, i.e., odd number steps and even number steps of the Y-axis in the image display area 210, and transmits them.

Figure 7:
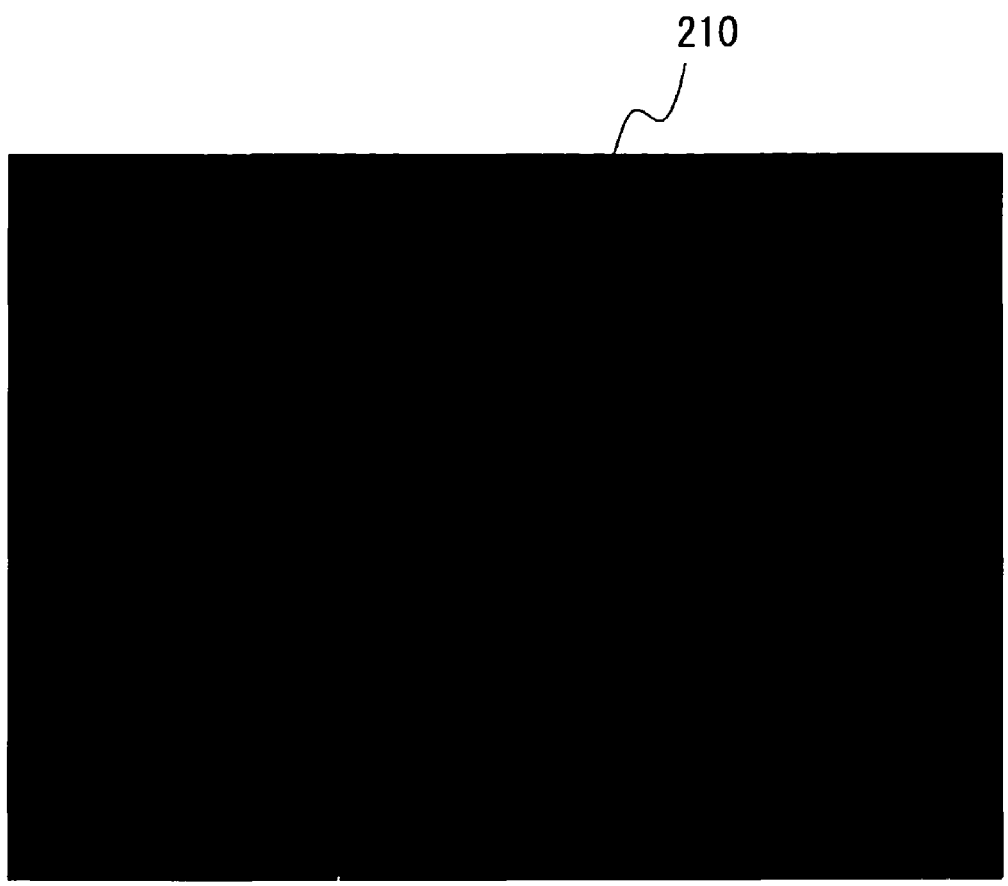
FIG. 7 is a diagram showing an example of screen data at the time of time t<0 in FIG. 5.
Figure 8:
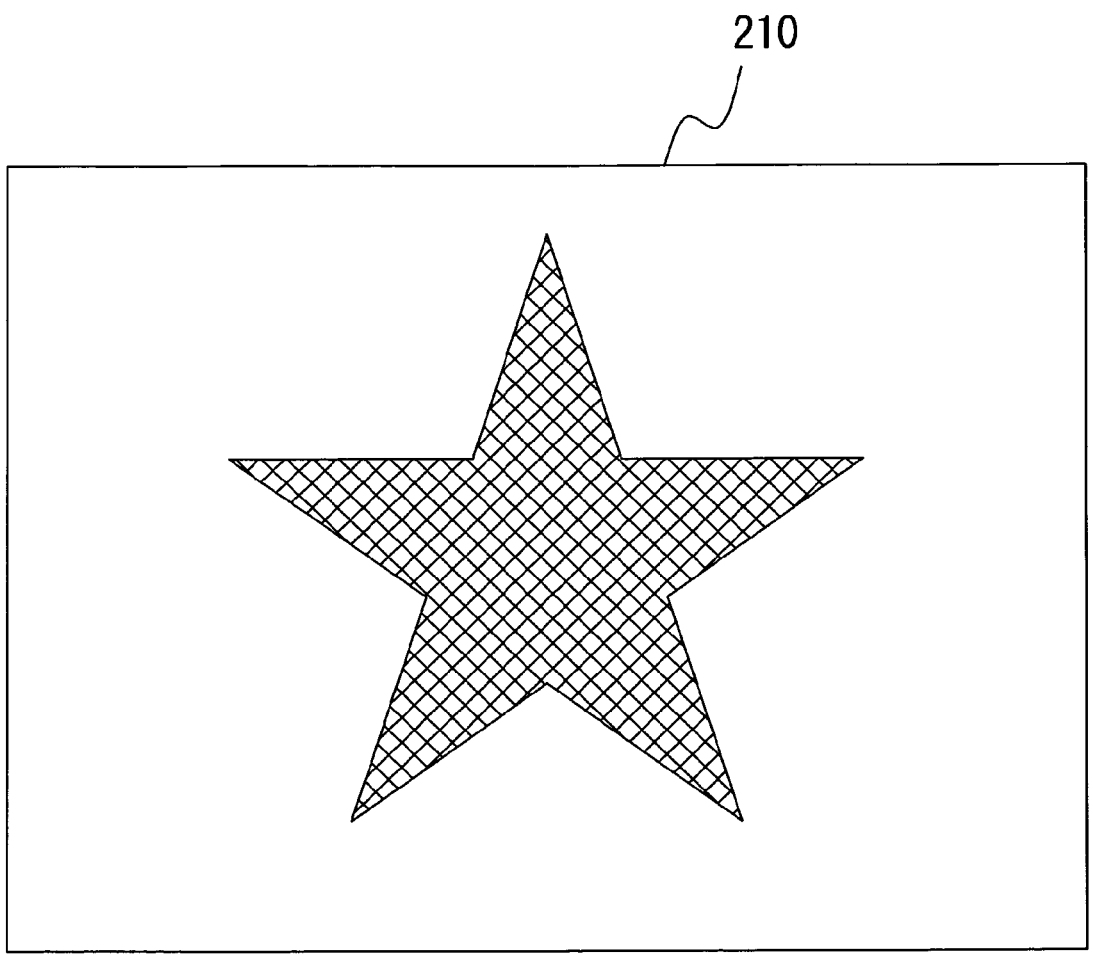
FIG. 8 is a diagram showing an example of the screen data at the time of time t=0 in FIG. 5.

For example, it is assumed that the screen data displayed on the monitor 150 is a solid black image as shown in FIG. 7 at the time point of t<0 in FIG. 5, and then the screen data changes to a star image as shown in FIG. 8 at the time point of t=0 in FIG. 5.

The screen data in FIG. 8 is transmitted from the KVM switch 110 to the client 100 via the network 130 at timing of the rightward arrow 541. Then, the KVM switch 110 causes the monitor 150 to display an image received from the server 120 at timing of the rightward arrow 551.

Figure 9:
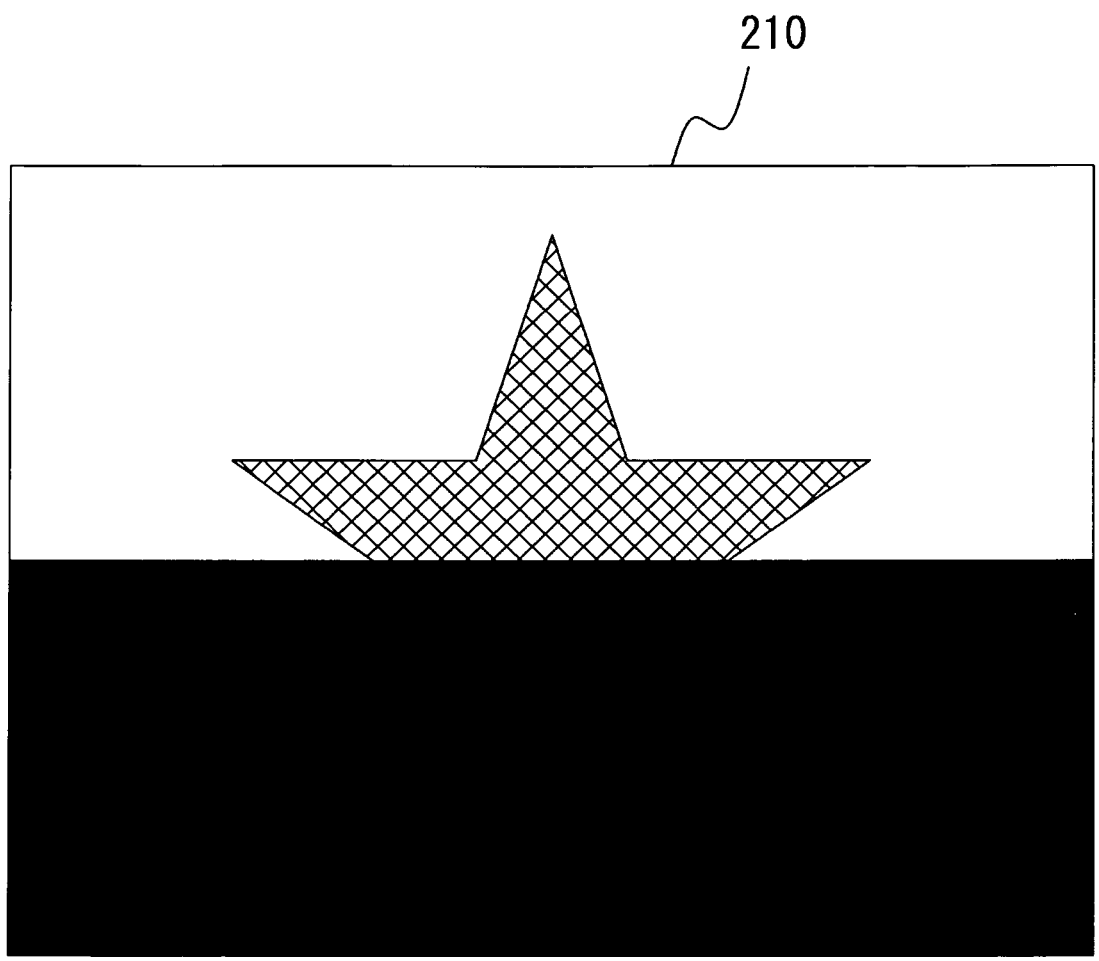
FIG. 9 is a diagram showing an example of the screen data displayed on the monitor when an amount of the transmission of the screen data is limited to an amount of data corresponding to the half of the image display area.

At this time, when the transmission amount of the screen data is limited to the amount of data corresponding to the half of the image display area 210 in the conventional method, the monitor 150 displays the screen data in which an area corresponding to values of 240 to 480 on the Y-axis is solid black, as shown in FIG. 9.

Figure 10:
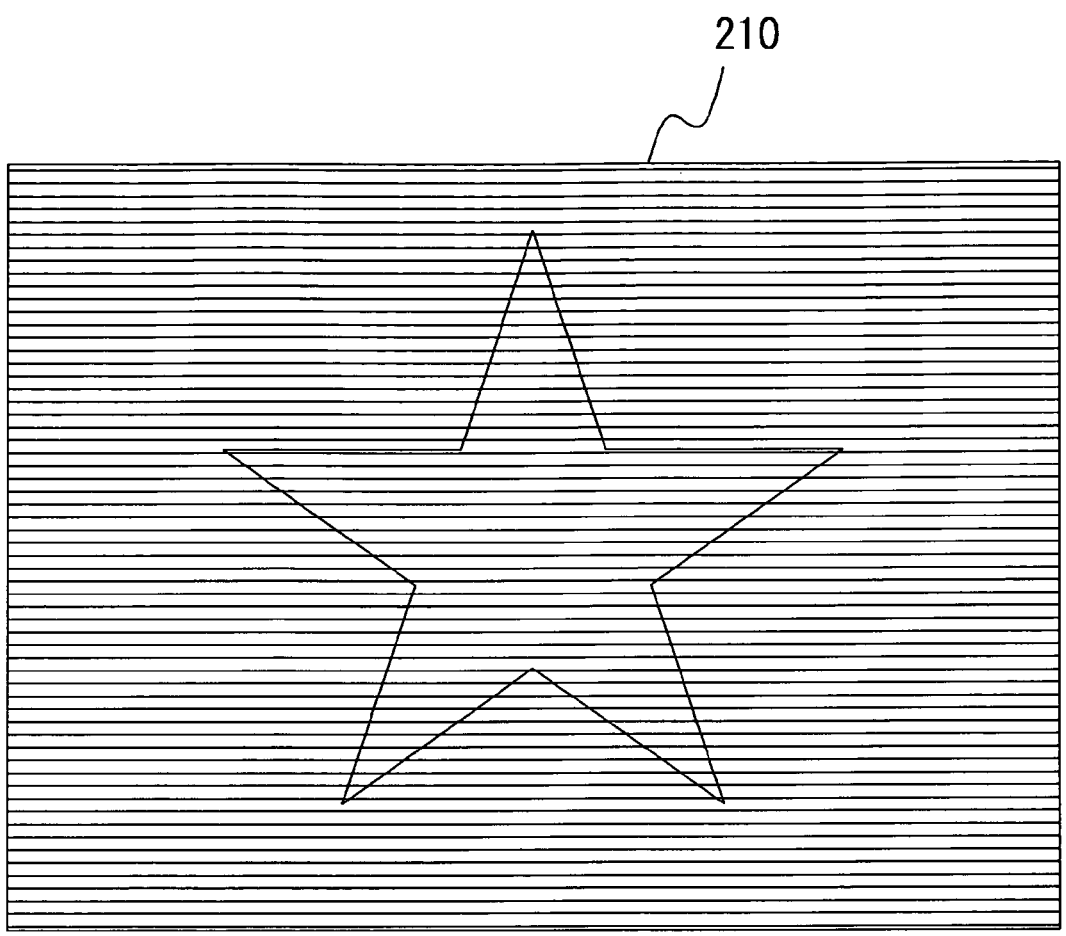
FIG. 10 is a diagram showing an example of the screen data displayed on the monitor in the case of dividing image data which a KVM switch transmits from the server to the client, into two, i.e., odd number steps and even number steps of the Y-axis in the image display area, and transmitting them.

However, when the KVM switch 110 divides the screen data transmitted from the server 120 to the client 100 into two, i.e., odd number steps and even number steps of the Y-axis in the image display area 210, and transmits them, the monitor 150 displays the screen data having a star shape as shown in FIG. 10. Thus, the user recognizes more accurately that the screen data transmitted from the server 120 is a star. Then, the KVM switch 110 transmits screen data which is non-transmitted to the client 100 and is previously thinned out to the client 100, and the client 100 combines the previously transmitted screen data with the subsequently transmitted screen data, and causes the monitor 150 to display the combined screen data, as shown in FIG. 8.

Figure 11:
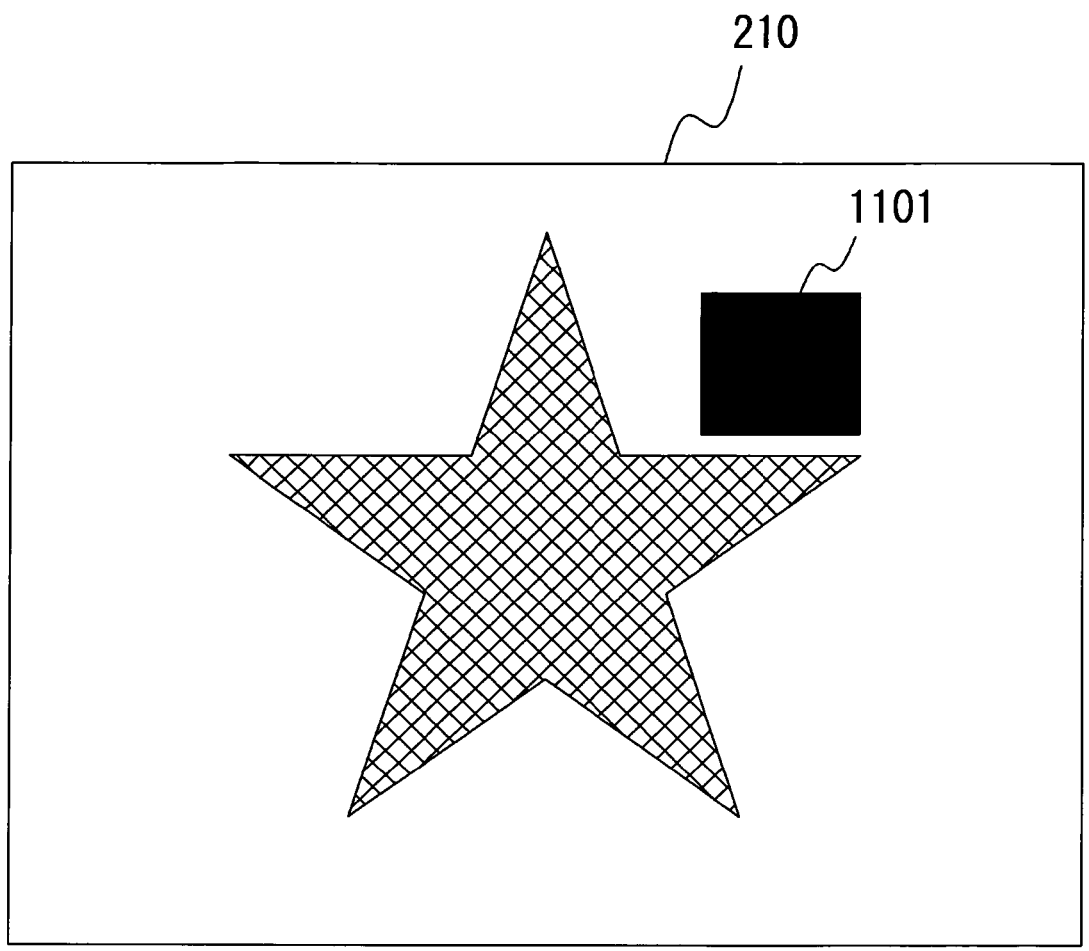
FIG. 11 is a diagram showing an example in which square data of 10×100 pixels is displayed after the image in FIG. 8 is displayed on the monitor.

Moreover, it is assumed that after the image in FIG. 8 is displayed on the monitor 150, data of a square 101 of 100*100 pixels is displayed as shown in FIG. 11.

When the color of one pixel is shown in the form of BGR233 as described above, an amount of data for the square area of 100*100 pixels is 10000[byte] (i.e., about 9.7 [kbyte]). It should be noted that position information indicative of a position where the square 101 is displayed is omitted.

Figure 12:
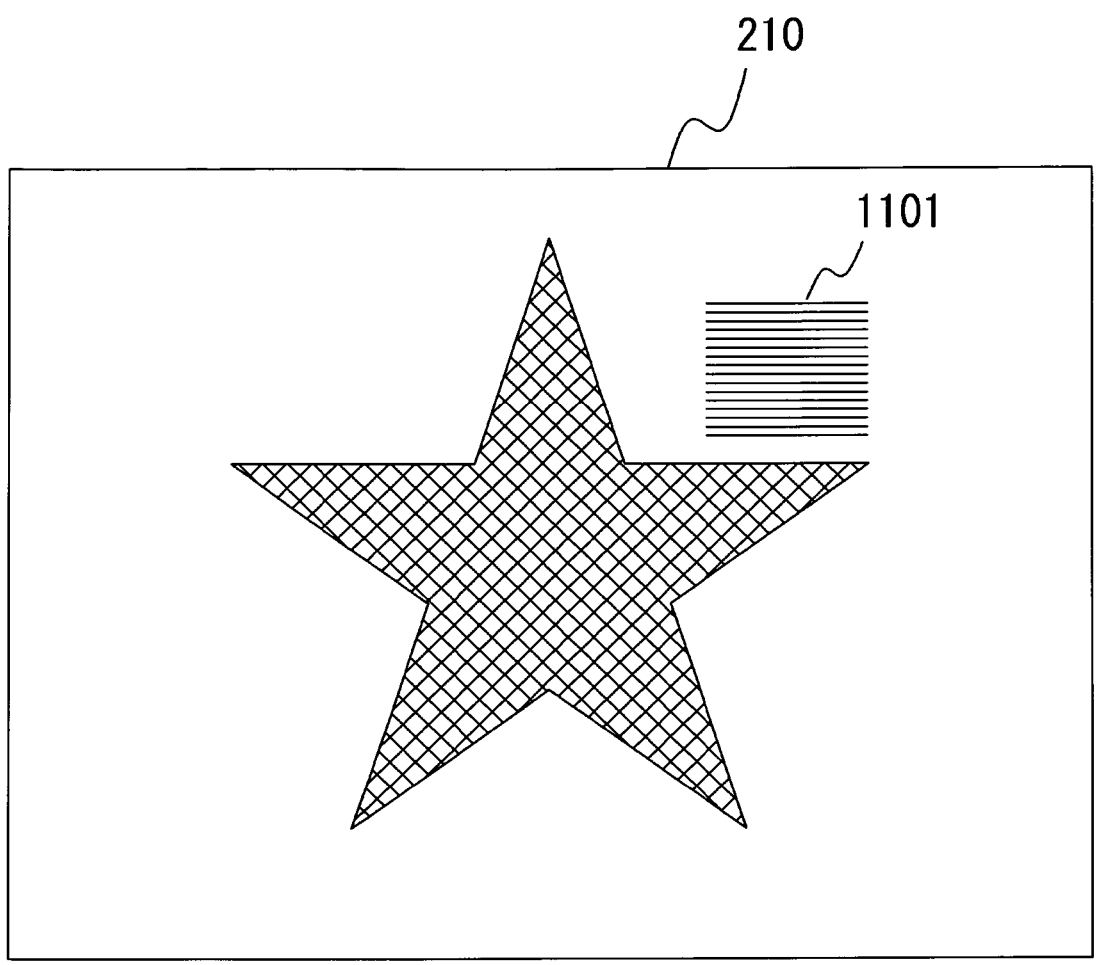
FIG. 12 is a diagram showing an example of the screen data when square data is thinned out so as to be stripes.

When the KVM switch 110 thins out the data of the square 101 so as to be a stripe, and transmits the thinned-out data to the client 100, the screen data as shown in FIG. 12 is displayed on the image display area 210 of the monitor 150.

Here, as shown in the screen data of FIG. 12, a changing part of the screen and the content of the change of the screen (i.e., square 1101) can be easily surmised, and the KVM switch 110 therefore may transmit no thinned-out screen data to the client 100.

The transmission amount of the screen data until this time is 5000[byte] (i.e., 4.9[kbyte]) that corresponds to the half of the square area of 10×100 pixels. When the case where the thinned-out data is not transmitted to the client 100 is compared with the case where all the screen data of the square 1101 is transmitted to the client 100, the former case becomes about a half of the latter case with regard to the amount of data transmitted to the client 100, and hence the former case can reduce a network load. Further, the former case can reduce the amount of the screen data transmitted from the server 120 to the client 100, and increase chances to receive the operation data from the input device 140 connected to the client 100.

Figure 13:
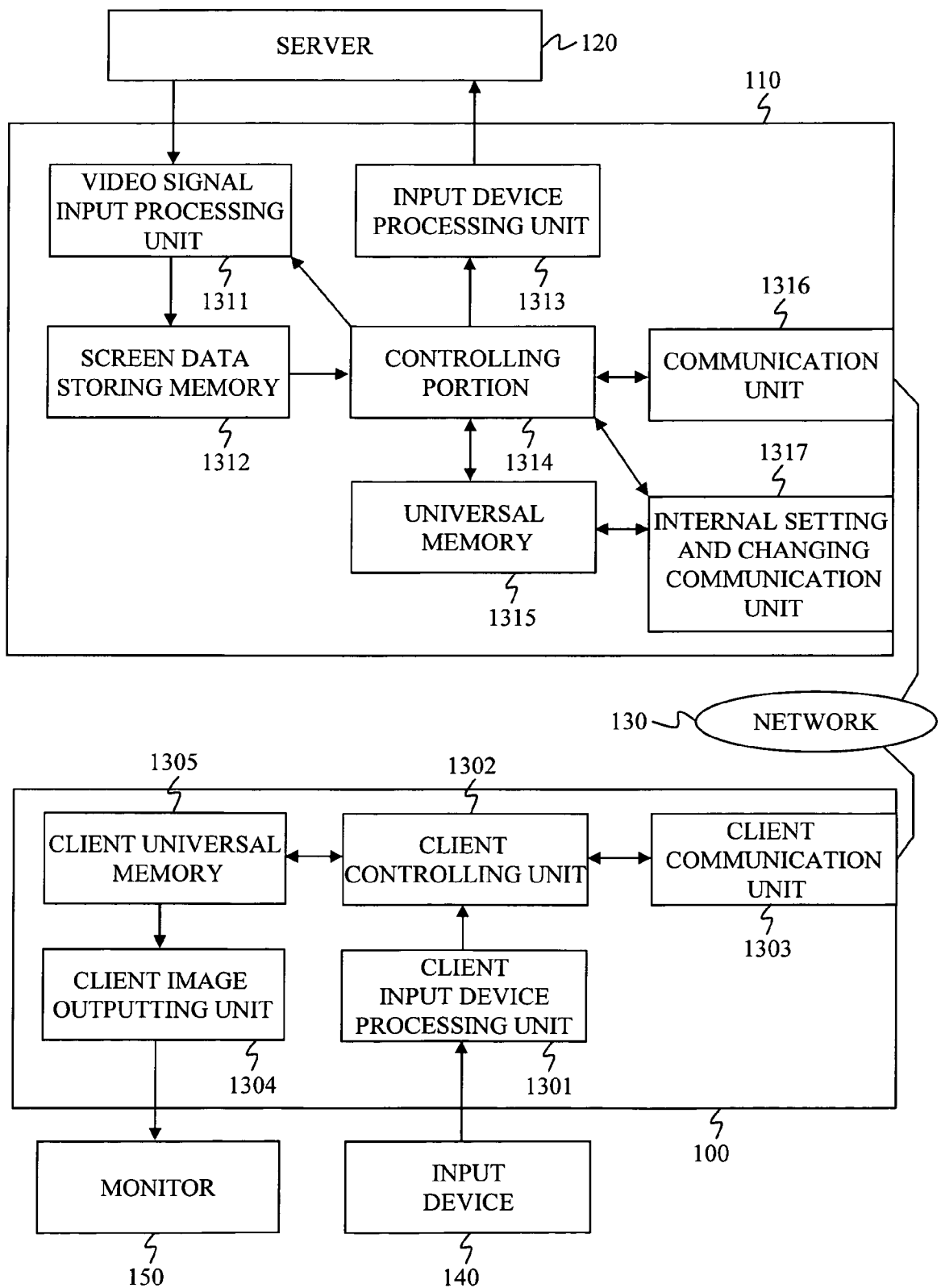
FIG. 13 is a diagram showing in detail the construction of the server-client system in FIG. 1.

FIG. 13 is a diagram showing in detail the construction of the server-client system in FIG. 1.

The KVM switch 110 includes: a video signal input processing unit 1311 (a signal processing portion, a detecting portion) that receives an image signal (i.e., a video signal) output from the server 120, and converts the image signal into digital data (i.e., screen data); a screen data storing memory 1312 (a storing portion) that stores the screen data and information relating to the screen data (e.g., information of X-coordinate and Y-coordinate of a changing area described later, the number of pieces of horizontal data and vertical data in the changing area, and so on); an input device processing unit 1313 (a transmitting portion) that transmits data of the input device to the server 120; a controlling portion 1314 (a thinning-out portion) that converts the screen data stored into the screen data storing memory 1312 into data transmittable to the network, and converts the received operation data into the data of the input device; a universal memory 1315 (a storing portion) that temporarily stores the screen data of the changing area after the thinning out, and store values indicative of a thinning-out method of the screen data of the changing area (i.e., a division rate (n), a transmission line (l), and a thinning-out form (m) as described later) and a value indicative of a permissible band (bw) on the network 130 occupied by transmitting the screen data of the changing area; a communication unit 1316 (a transmitting and receiving portion) that communicates the screen data of the changing area and the operation data with the client 100 via the network 130; and an internal setting and changing communication unit 1317 (a thinning-out portion, and a setting portion) that sets or changes the permissible band on the network 130 and the thinning-out form of the screen data of the changing area.

The universal memory 1315 includes a screen transmitting buffer for temporarily storing the screen data of the changing area after the thinning out. When the screen data of the changing area after the thinning out is transmitted to the client 100, the screen transmitting buffer stores the screen data of the changing area corresponding to the next thinned-out part.

In FIG. 13, the division rate (n), the transmission line (l), the thinning-out form (m), and the permissible band (bw) stored into the universal memory 1315 can be changed by the internal setting and changing communication unit 1317, and can be changed by the client 100 via the network 130 and the communication unit 1316.

The controlling portion 1314 has a function which controls a transmission interval of a packet including the screen data of the changing area transmitted to the client 100 so that the transfer rate of the screen data of the changing area transmitted to the client 100 is accommodated in the value of the permissible band (bw) stored into the universal memory 1315. In this case, the internal setting and changing communication unit 1317 has table data shown in FIG. 24, and the controlling portion 1314 decides the transmission interval of the packet according to the table data and the value of the permissible band (bw) stored into the universal memory 1315. In the table data shown in FIG. 24, the smaller the value of the permissible band (bw) is, the longer the transmission interval of the packet are.

According to this function, a communication band on the network used for the transfer of the screen data of the changing area is limited to the value of the permissible band set by the internal setting and changing communication unit 1317, and hence all of the communication band on the network is not occupied by the transmission of the image data from the server 120 to the client 100 as in the prior art. Therefore, it is possible to secure chances to receive the operation data from the input device 140 connected to the client 100.

Further, the controlling portion 1314 has a function which automatically adjusts the division rate (n), the transmission line (l), and the thinning-out form (m) stored into the universal memory 1315, and transmits the screen data of the changing area to the client 100 so that the transfer rate of the screen data of the changing area transmitted to the client 100 is accommodated in the value of the permissible band (bw) stored into the universal memory 1315. In this case, the internal setting and changing communication unit 1317 has table data shown in FIG. 25, for example, and the controlling portion 1314 decides the division rate (n) according to the table data and the value of the permissible band (bw) stored into the universal memory 1315. In the table data shown in FIG. 25, the smaller the value of the permissible band (bw) is, the more the division rate (n) is enlarged, thereby reducing the transmission amount of data per one packet.

According to this function, the communication band on the network used for the transfer of the screen data of the changing area is limited to the value of the permissible band set by the internal setting and changing communication unit 1317, and hence all of the communication band on the network is not occupied by the transmission of the image data from the server 120 to the client 100 as in the prior art. Therefore, it is possible to secure chances to receive the operation data from the input device 140 connected to the client 100.

The above-mentioned two functions of the controlling portion 1314 can be used together or each of the two functions can be used alone. Whether these functions are used together or each of the two functions is be used alone is set by the internal setting and changing communication unit 1317 or the client 100 via the network 130 and the communication unit 1316.

The controlling portion 1314 is connected to the video signal input processing unit 1311, the screen data storing memory 1312, the input device processing unit 1313, the universal memory 1315, the communication unit 1316, and the internal setting and changing communication unit 1317. The internal setting and changing communication unit 1317 is connected to the universal memory 1315, and the video signal input processing unit 1311 is connected to the screen data storing memory 1312.

The client 100 includes: a client input device processing unit 1301 that receives the operation data from the input device 140; a client controlling unit 1302 that packetizes the operation data; a client communication unit 1303 that communicates the screen data of the changing area and the operation data with the KVM switch 110 via the network 130; a client image outputting unit 1304 that synthesizes the screen data of the changing area and the screen data under display with each other, and outputs the synthesized data to the monitor 150; and a client universal memory 1305 that temporarily stores the screen data of the changing area. The client controlling unit 1302 is connected to the client input device processing unit 1301, the client communication unit 1303, and the client universal memory 1305. The client image outputting unit 1304 is connected to the client universal memory 1305.

Figure 14:
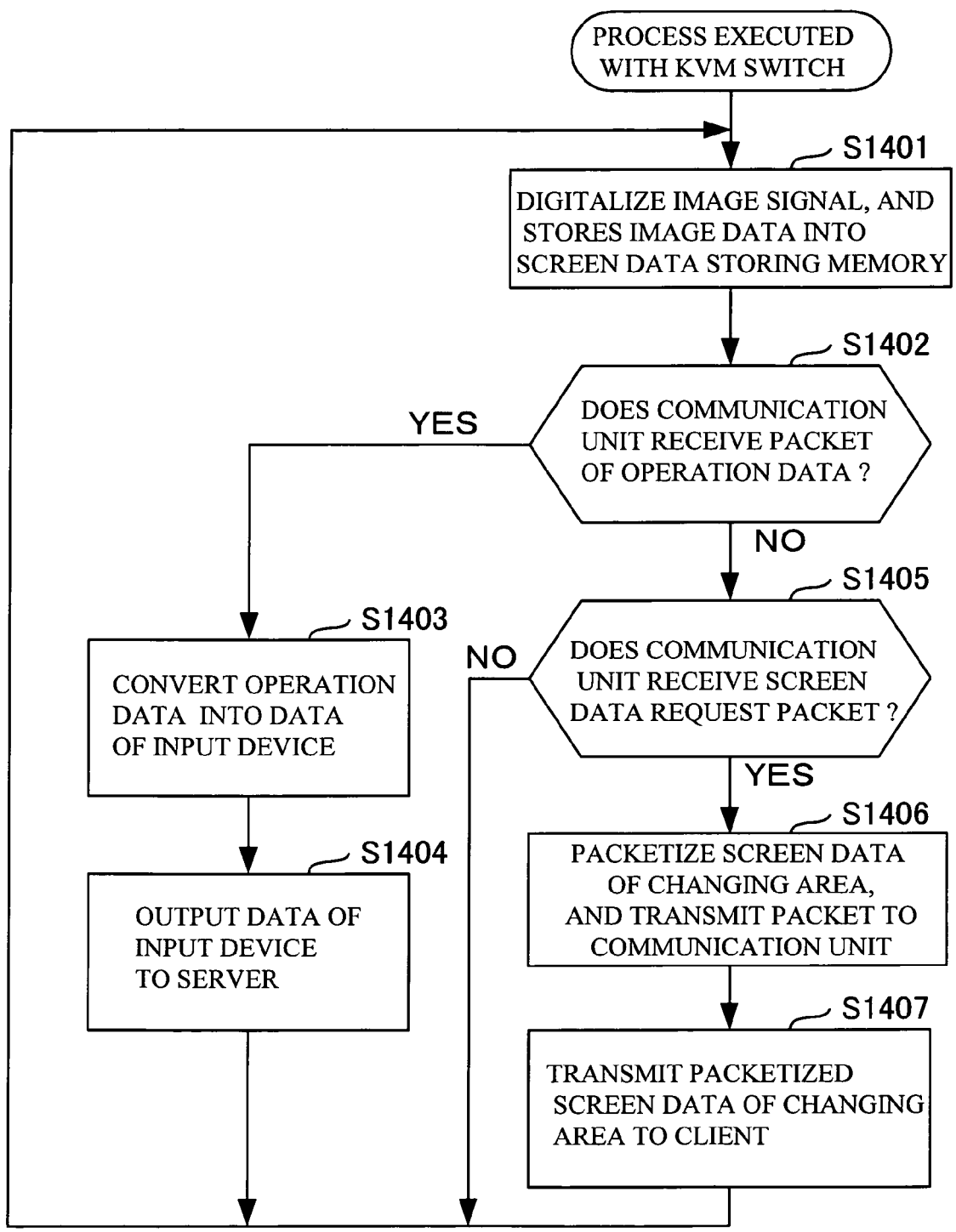
FIG. 14 is a diagram showing a process executed with a KVM switch.

FIG. 14 is a diagram showing a process executed with the KVM switch 110.

The video signal input processing unit 1311 converts an image signal output from the server 120 into a digital signal, and stores digitalized image data (i.e., screen data) into the screen data storing memory 1312 (step S1401).

Figure 15:
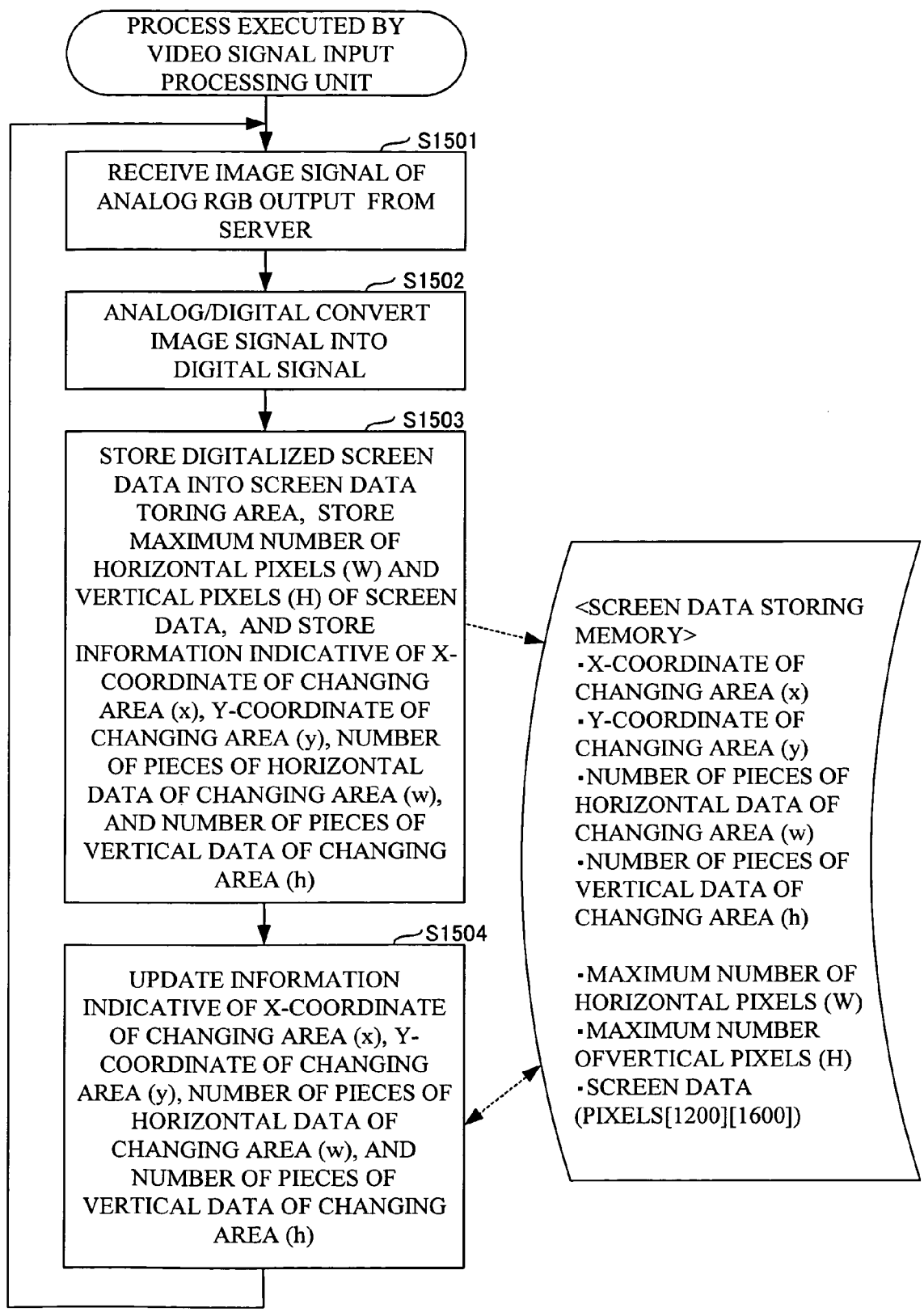
FIG. 15 is a diagram showing a process executed by a video signal input processing unit.

Here, FIG. 15 shows a process executed by the video signal input processing unit 1311.

The video signal input processing unit 1311 receives the image signal of analog RGB output from the server 120 (step S1501), analog/digital converts the image signal into a digital signal (step S1502), and stores the digitalized screen data into a screen data storing area (pixels[1200][1600]) of the screen data storing memory 1312 together with the maximum number of horizontal pixels (W) and vertical pixels (H) of the screen data (step S1503). Further, the screen data storing memory 1312 stores information indicative of X-coordinate of the changing area (x), Y-coordinate of the changing area (y), the number of pieces of horizontal data of the changing area (w), and the number of pieces of vertical data of the changing area (h).

When the video signal input processing unit 1311 detects screen data different from the screen data stored into the screen data storing memory 1312, i.e., detects the changing area of the screen data, the video signal input processing unit 1311 updates the information indicative of the X-coordinate of the changing area (x), the Y-coordinate of the changing area (y), the number of pieces of horizontal data of the changing area (w), and the number of pieces of vertical data of the changing area (h) stored into the screen data storing memory 1312 (step S1504). The procedure returns to step S1501.

The video signal input processing unit 1311 may receive the image signal of analog RGB output from the server 120, thin out the analog image signal based on thinning-out information indicated from the controlling portion 1314 (i.e., the division rate (n), the transmission line (l), and the thinning-out form (m) stored into the universal memory 1315), analog/digital convert the thinned-out analog image signal into a digital image signal, and store the digital image signal as the screen data into the screen data storing area (pixels[1200][1600]) of the screen data storing memory 1312. In this case, the controlling portion 1314 reads out the screen data stored into the screen data storing area without executing thinning-out process again, and packetizes the screen data to thereby transmit the packet to the client 100. After the screen data after the thinning-out is analog/digital converted and transmitted to the client 100, the screen data which corresponds to thinned-out parts, i.e., is not transmitted to the client 100 yet is analog/digital converted and transmitted to the client 100.

Figure 16:
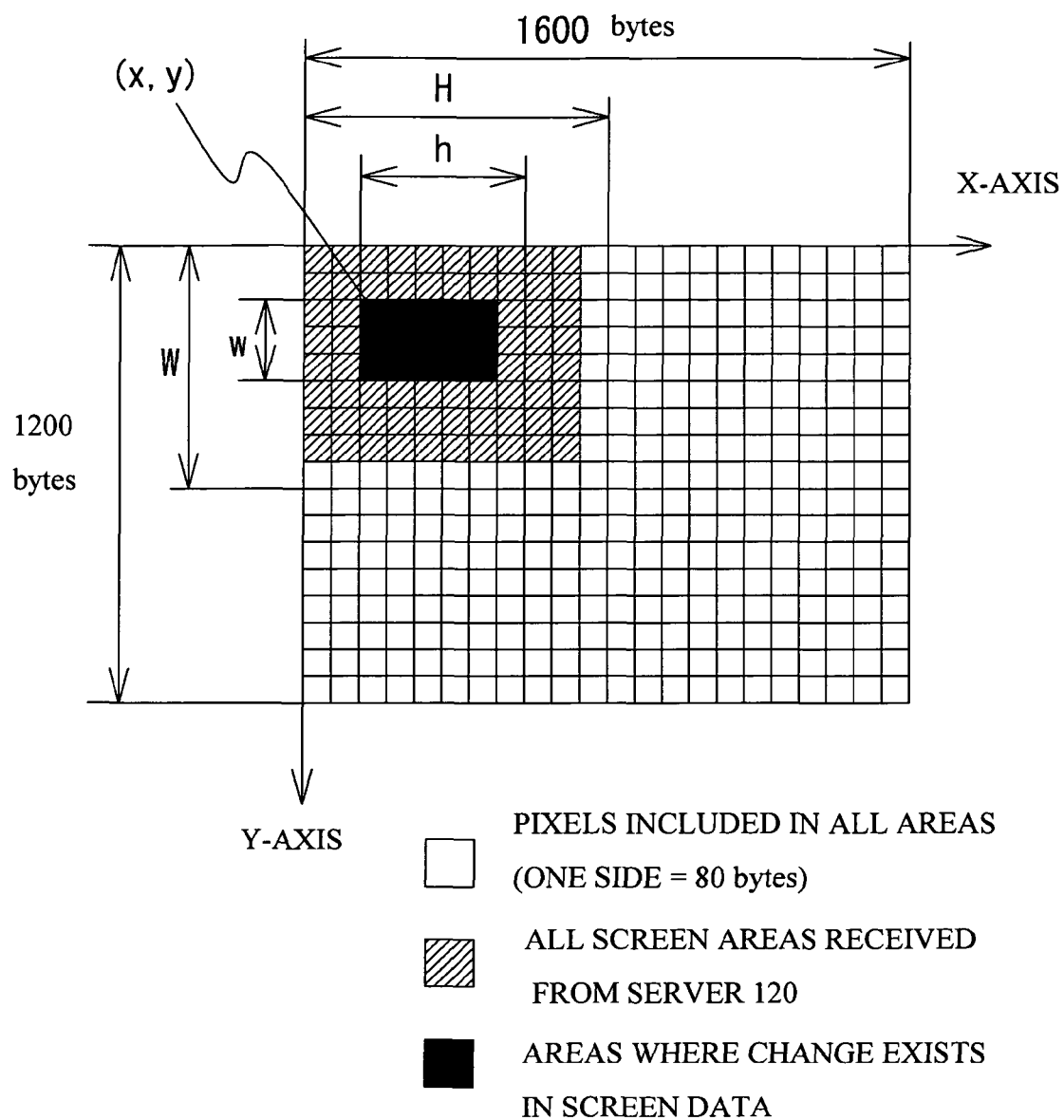
FIG. 16 is a diagram showing relationship between screen data of screen data storing memory (pixels[1200][1600]), the maximum number of horizontal pixels (W), the maximum number of vertical pixels (H), X-coordinate of a changing area (x), Y-coordinate of the changing area (y), the number of pieces of horizontal data of the changing area (w), and the number of pieces of vertical data of the changing area (h)

FIG. 16 shows relationship between the screen data of the screen data storing memory (pixels[1200][1600]), the maximum number of horizontal pixels (W), the maximum number of vertical pixels (H), X-coordinate of the changing area (x), Y-coordinate of the changing area (y), the number of pieces of horizontal data of the changing area (w), and the number of pieces of vertical data of the changing area (h).

Referring again to FIG. 14, the controlling portion 1314 determines whether the communication unit 1316 receives a packet of the operation data from the client 100 (step S1402). The packet of the operation data is transmitted from the client 100 to the KVM switch 110 when the user operates the input device 140 connected to the client 100 in order to execute remote operation of the server 120. The packet is generated by the client controlling unit 1302 from the operation data received by the client input device processing unit 1301, according to a well-known protocol rule used with a general remote system such as an RFB protocol. The packet is transmitted from the client communication unit 1303 to the communication unit 1316 of the KVM switch 110.

When the answer to the determination of step S1402 is "YES", the controlling portion 1314 reads the packet of the operation data from the communication unit 1316, and converts the packet into the data of the input device (step S1403).

Next, the controlling portion 1314 informs the input device processing unit 1313 of the data of the input device, and the input device processing unit 1313 outputs the data of the input device to the server 120 (step S1404). The procedure returns to step S1401.

When the answer to the determination of step S1402 is "NO", the controlling portion 1314 determines whether the communication unit 1316 receives a screen data request packet from the client 100 (step S1405).

When the answer to the determination of step S1405 is "NO", the procedure returns to step S1401. When the answer to the determination of step S1405 is "YES", the controlling portion 1314 packetizes the screen data of the changing area, and transmits the packet to the communication unit 1316 (step S1406). The communication unit 1316 transmits the packetized screen data of the changing area to the client 100 (step S1407). The procedure returns to step S1401.

When a state of the input device 140 is included in the screen data request packet received from the client 100, the operation data is converted into the data of the input device 140. The state of the input device 140 shows information on keys struck with the keyboard and information of coordinates of the mouse cursor when the input device 140 is composed of the keyboard and the mouse.

Since the operation data received by the communication unit 1316 in step S1402 is transmitted according to timing when the operation of the input device 140 occurs, a band concerning the operation data of the input device 140 is not constant, and hence there is a threat that the packet of the operation data is unexpectedly defeated depending on a state of the network. Therefore, regardless of the presence of the change in the state of the input device 140, state data of the input device 140 is included in the screen data request packet transmitted by the client 100. As a result, it is always possible to secure the band concerning the operation data of the input device 140.

Figure 17:
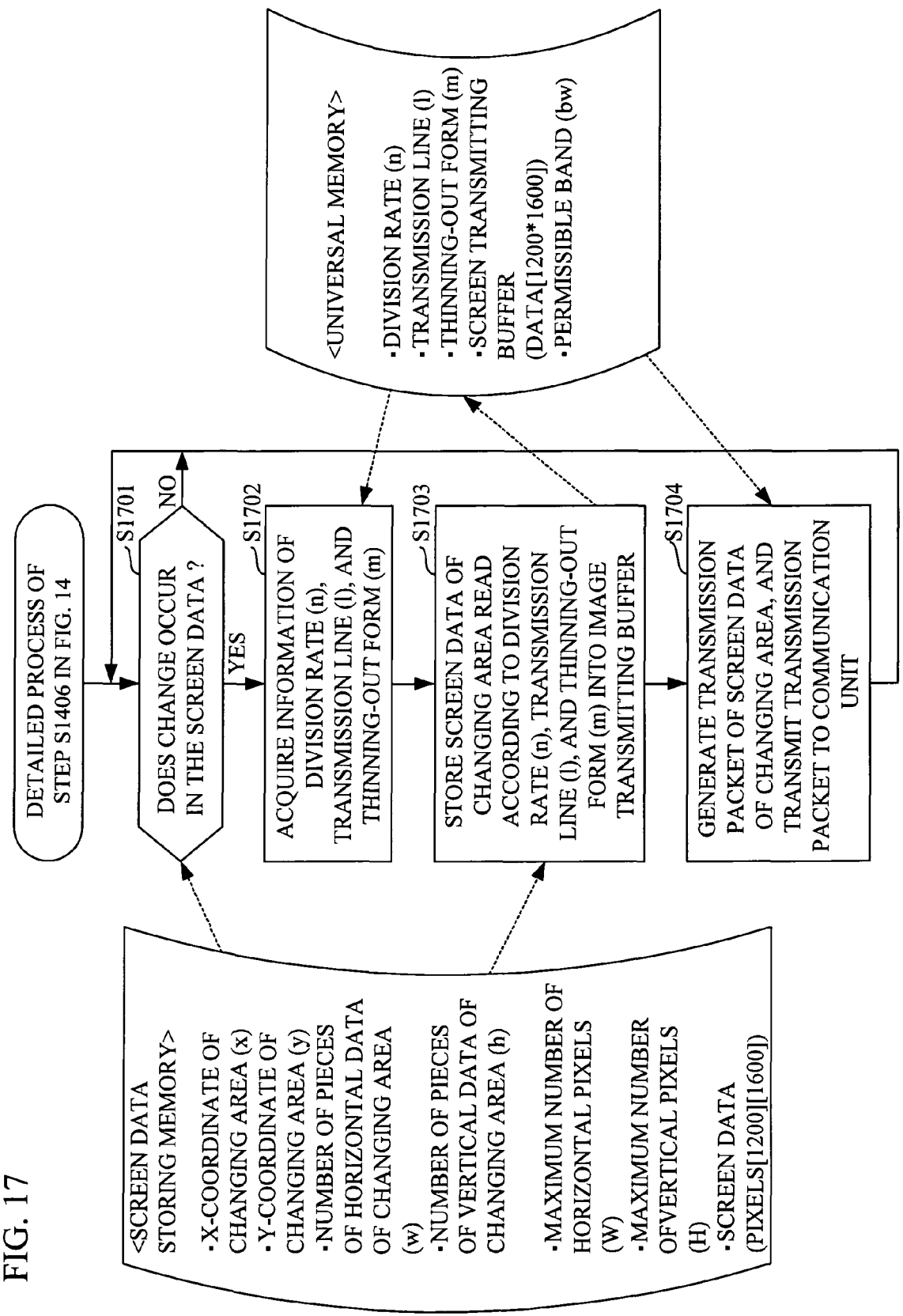
FIG. 17 is a flowchart showing a detailed process of step S1406 in FIG. 14 executed by a controlling unit.

FIG. 17 is a flowchart showing a detailed process of step S1406 in FIG. 14 executed by the controlling unit 1314.

The controlling unit 1314 reads X-coordinate of the changing area (x), Y-coordinate of the changing area (y), the number of pieces of horizontal data of the changing area (w), and the number of pieces of vertical data of the changing area (h) from the screen data storing memory 1312, and determines whether change occurs in the screen data (step S1701).

When the answer to the determination of step S1701 is "NO", the determination is repeated. On the other hand, when the answer to the determination of step S1701 is "YES", the controlling unit 1314 acquires information of the division rate (n), the transmission line (l), and the thinning-out form (m) from the universal memory 1315 (step S1702). These are values showing the thinning-out method of the screen data of the changing area stored into the screen data storing memory 1312.

Specifically, the thinning-out form (m) is a value showing a pattern caused by the thinning-out method of the screen data of the changing area. When the "m" is "0", the thinning-out method of the screen data of the changing area is not executed. When the "m" is "1", the pattern caused by the thinning-out method of the screen data of the changing area is a vertical stripe. When the "m" is "2", the pattern caused by the thinning-out method of the screen data of the changing area is a horizontal stripe. When the "m" is "3", the pattern caused by the thinning-out method of the screen data of the changing area is a checkered pattern. The division rate (n) and the transmission line (l) are values showing an amount of the thinning-out of the screen data of the changing area to be the pattern indicated by the thinning-out form (m).

The controlling unit 1314 stores the screen data of the changing area read from the screen data storing area (pixels [1200][1600]) of the screen data storing memory 1312 according to the division rate (n), the transmission line (l), and the thinning-out form (m) into the screen transmitting buffer (data[1200*1600]) of the universal memory 1315 (step S1703).

Figure 18A:
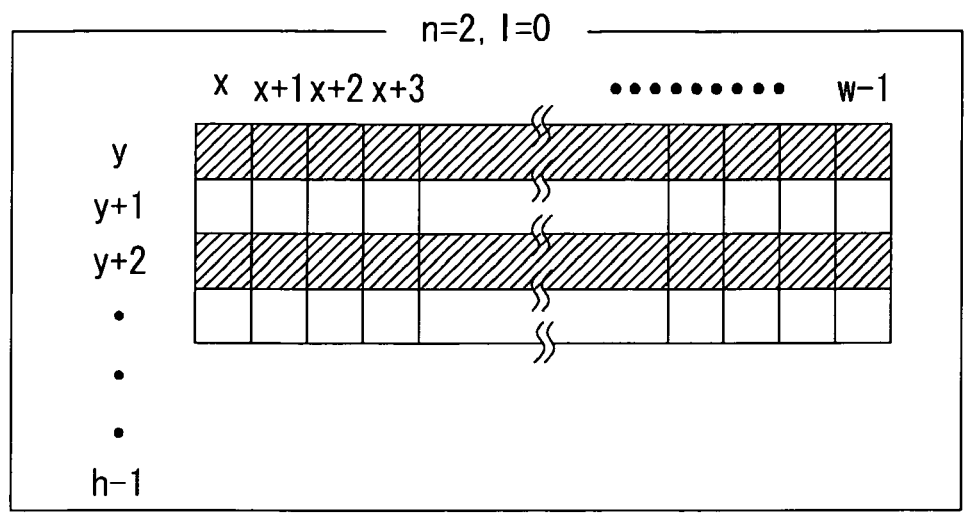
FIG. 18A is a diagram showing a part of data read from a screen data storing area (pixels[1200][1600]) of the screen data storing memory with hatches when a thinning-out form (m) is "1", a division rate (n) is "2", and a transmission line (l) is "0"
Figure 18B:
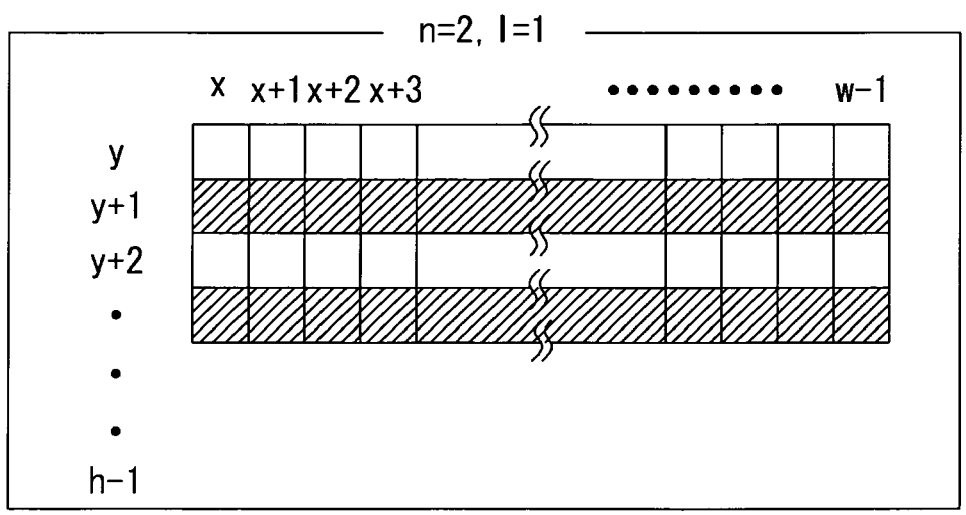
FIG. 18B is a diagram showing a part of data read from the screen data storing area (pixels[1200][1600]) of the screen data storing memory with hatches when the thinning-out form (m) is "1", the division rate (n) is "2", and the transmission line (l) is "1"

FIG. 18A is a diagram showing a part of data read from the screen data storing area (pixels[1200][1600]) of the screen data storing memory 1312 with hatches when the thinning-out form (m) is "1", the division rate (n) is "2", and the transmission line (l) is "0", and FIG. 18B is a diagram showing a part of data read from the screen data storing area (pixels[1200][1600]) of the screen data storing memory with hatches when the thinning-out form (m) is "1", the division rate (n) is "2", and the transmission line (l) is "1".

Figure 19A:
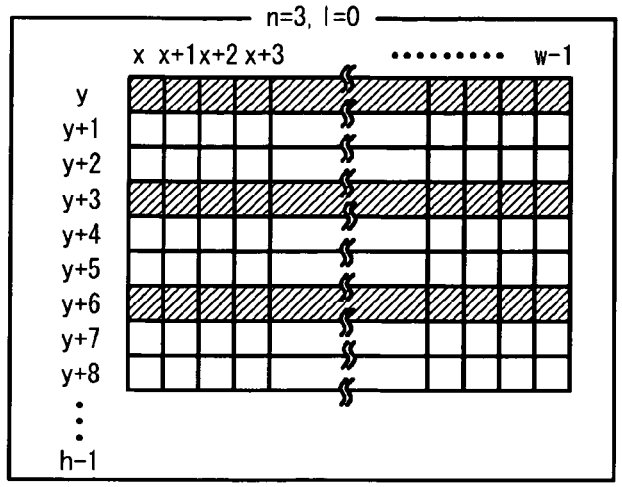
FIG. 19A is a diagram showing a part of data read from the screen data storing area (pixels[1200][1600]) of the screen data storing memory with hatches when the thinning-out form (m) is "1", the division rate (n) is "3", and the transmission line (l) is "0"
Figure 19B:
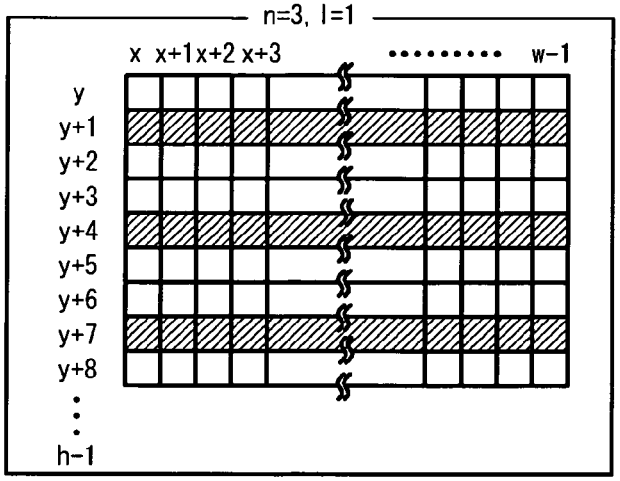
FIG. 19B is a diagram showing a part of data read from the screen data storing area (pixels[1200][1600]) of the screen data storing memory with hatches when the thinning-out form (m) is "1", the division rate (n) is "3", and the transmission line (l) is "1"
Figure 19C:
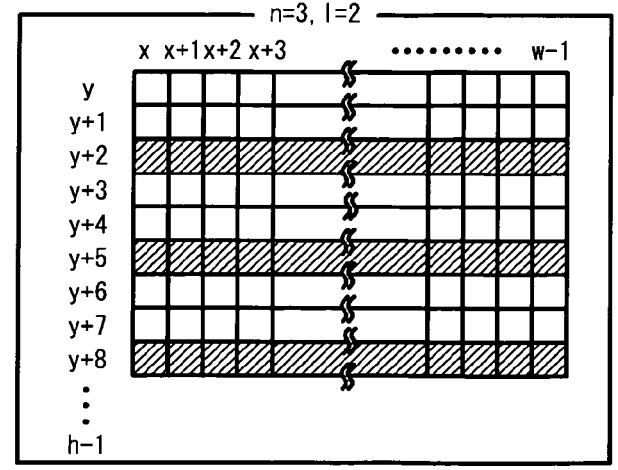
FIG. 19C is a diagram showing a part of data read from the screen data storing area (pixels[1200][1600]) of the screen data storing memory with hatches when the thinning-out form (m) is "1", the division rate (n) is "3", and the transmission line (l) is "2"

FIG. 19A is a diagram showing a part of data read from the screen data storing area (pixels[1200][1600]) of the screen data storing memory 1312 with hatches when the thinning-out form (m) is "1", the division rate (n) is "3", and the transmission line (l) is "0", FIG. 19B is a diagram showing a part of data read from the screen data storing area (pixels [1200][1600]) of the screen data storing memory 1312 with hatches when the thinning-out form (m) is "1", the division rate (n) is "3", and the transmission line (l) is "1", and FIG. 19C is a diagram showing a part of data read from the screen data storing area (pixels[1200][1600]) of the screen data storing memory 1312 with hatches when the thinning-out form (m) is "1", the division rate (n) is "3", and the transmission line (l) is "2".

Figure 20A:
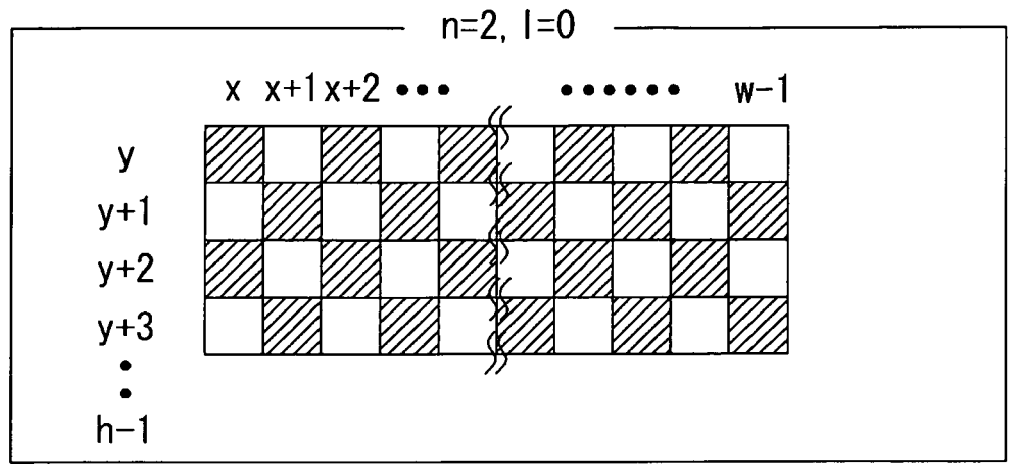
FIG. 20A is a diagram showing a part of data read from the screen data storing area (pixels[1200][1600]) of the screen data storing memory with hatches when the thinning-out form (m) is "3", the division rate (n) is "2", and the transmission line (l) is "0"
Figure 20B:
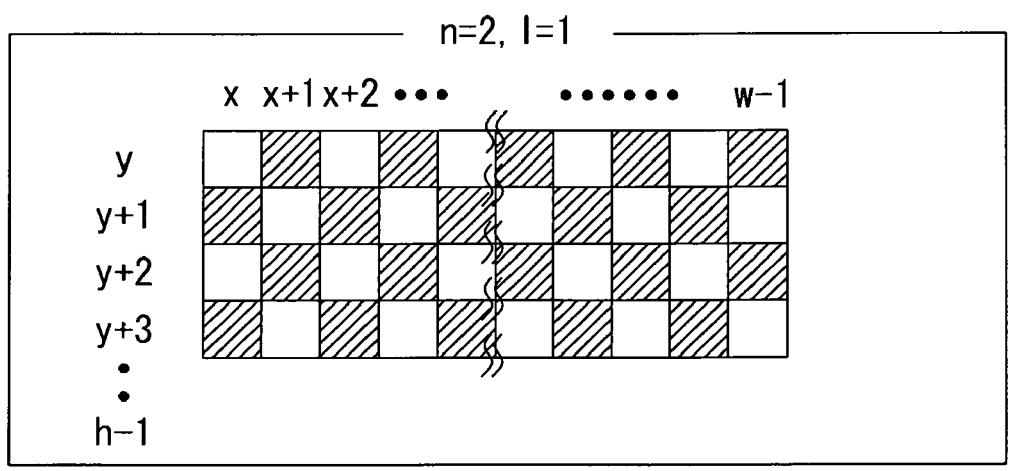
FIG. 20B is a diagram showing a part of data read from the screen data storing area (pixels[1200][1600]) of the screen data storing memory with hatches when the thinning-out form (m) is "3", the division rate (n) is "2", and the transmission line (l) is "1"

FIG. 20A is a diagram showing a part of data read from the screen data storing area (pixels[1200][1600]) of the screen data storing memory 1312 with hatches when the thinning-out form (m) is "3", the division rate (n) is "2", and the transmission line (l) is "0", and FIG. 20B is a diagram showing a part of data read from the screen data storing area (pixels[1200][1600]) of the screen data storing memory 1312 with hatches when the thinning-out form (m) is "3", the division rate (n) is "2", and the transmission line (l) is "1".

Figure 21A:
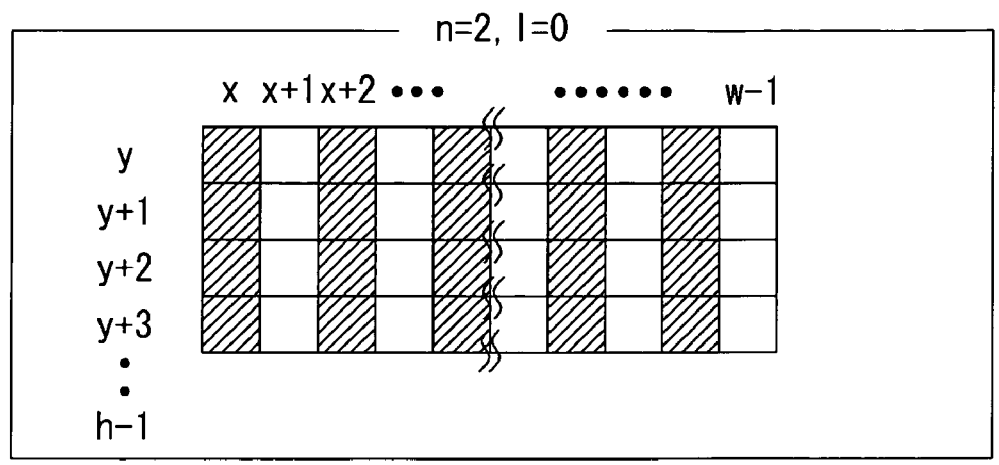
FIG. 21A is a diagram showing a part of data read from the screen data storing area (pixels[1200][1600]) of the screen data storing memory with hatches when the thinning-out form (m) is "2", the division rate (n) is "2", and the transmission line (l) is "0"
Figure 21B:
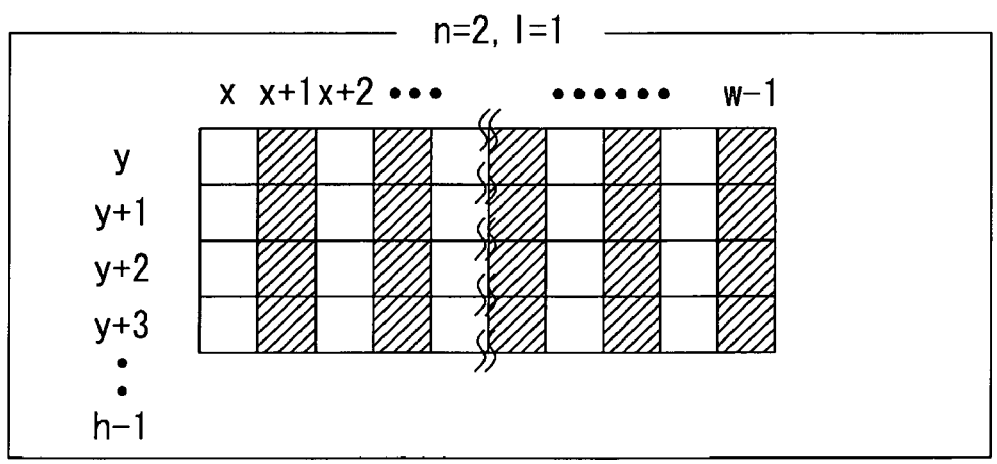
FIG. 21B is a diagram showing a part of data read from the screen data storing area (pixels[1200][1600]) of the screen data storing memory with hatches when the thinning-out form (m) is "2", the division rate (n) is "2", and the transmission line (l) is "1"

FIG. 21A is a diagram showing a part of data read from the screen data storing area (pixels[1200][1600]) of the screen data storing memory 1312 with hatches when the thinning-out form (m) is "2", the division rate (n) is "2", and the transmission line (l) is "0", and FIG. 21B is a diagram showing a part of data read from the screen data storing area (pixels[1200][1600]) of the screen data storing memory 1312 with hatches when the thinning-out form (m) is "2", the division rate (n) is "2", and the transmission line (l) is "1".

Referring again to FIG. 17, the controlling unit 1314 generates a transmission packet of the screen data of the changing area read from the screen transmitting buffer, and transmits the transmission packet to the communication unit 1316 (step S1704). The procedure returns to step S1701. The communication unit 1316 transmits the transmission packet of the screen data of the changing area to the client 100.

FIG. 22 is a diagram showing a format of the transmission packet indicative of the screen data of the changing area. In FIG. 22, an encode type means data showing a compression type of the screen data of the changing area.

Figure 23:
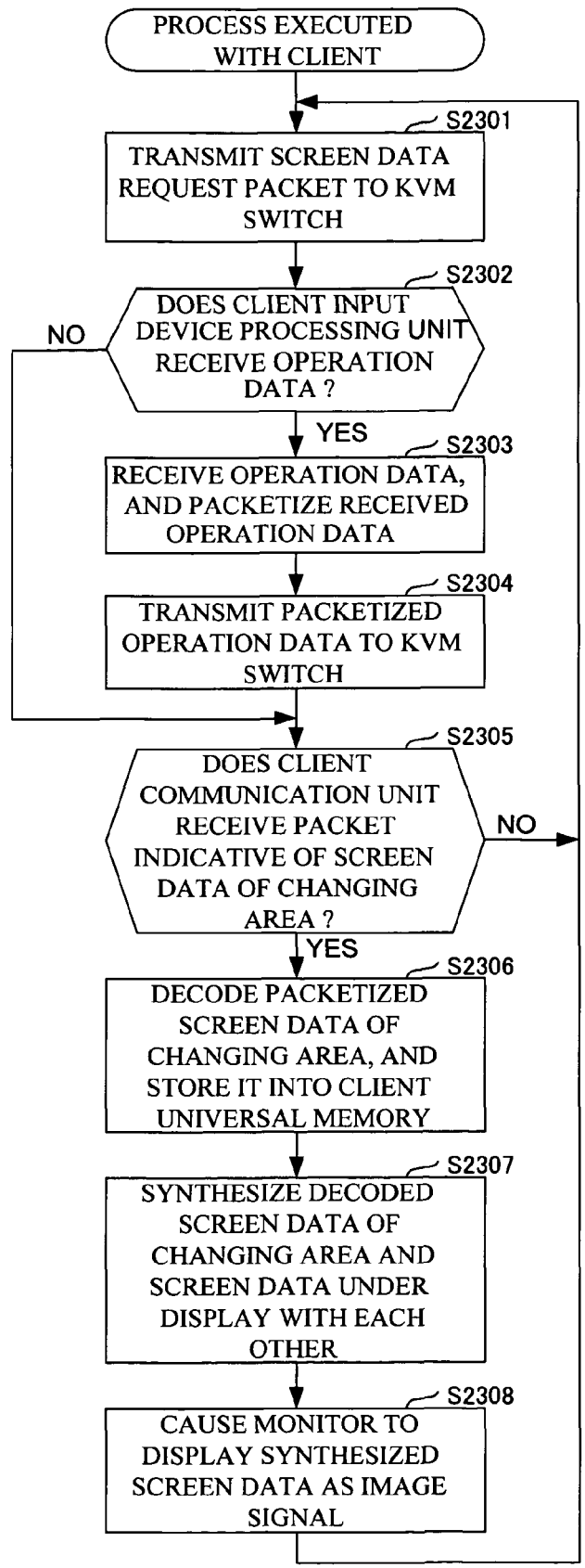
FIG. 23 is a flowchart showing a process executed with the client.

FIG. 23 is a flowchart showing a process executed with the client.

First, the client controlling unit 1302 transmits the screen data request packet to the KVM switch 110 via the client communication unit 1303 (step S2301). Next, the client controlling unit 1302 determines whether the client input device processing unit 1301 receives the operation data (step S2302).

When the answer to the determination of step S2302 is "NO", the procedure proceeds to step S2305 described later. When the answer to the determination of step S2302 is "YES", the client controlling unit 1302 receives the operation data from the client input device processing unit 1301, and packetizes the received operation data (step S2303). Then, the client controlling unit 1302 transmits the packetized operation data to the KVM switch 110 via the client communication unit 1303 (step S2304).

Next, the client controlling unit 1302 determines whether the client communication unit 1303 receives the packet indicative of the screen data of the changing area (step S2305).

When the answer to the determination of step S2305 is "NO", the procedure returns to step S2302. On the other hand, when the answer to the determination of step S2305 is "YES", the client controlling unit 1302 decodes the packetized screen data of the changing area, and stores the decoded screen data of the changing area into the client universal memory 1305 (step S2306). The client image outputting unit 1304 synthesizes the decoded screen data of the changing area and the screen data under display with each other (step S2307), and causes the monitor 150 to display the synthesized screen data as the image signal (step S2308). The procedure returns to step S2301.

As described in detail above, according to the embodiment of the present invention, the video signal input processing unit 1311 receives the analog image signal corresponding to the screen data displayed on the monitor 150 of the client 100 from the server 120, and executes the analog/digital conversion to the analog image signal, stores the digital image signal as the screen data into the screen data storing memory 1312. When a new screen data is stored into the screen data storing memory 1312, the video signal input processing unit 1311 detects data (i.e., the screen data of the changing area) corresponding to the change area of the new screen data to screen data that has already been stored. Then, the controlling unit 1314 thins out the screen data of the changing area. The communication unit 1316 transmits the screen data of the changing area after the thinning-out to the client 100, and receives the operation data from the input device connected to the client 100.

Therefore, only when there is a change of the screen data, the screen data is transmitted from the server 120 to the client 100, and further the screen data corresponds to the changing area and is thinned out. As a result, it is possible to reduce an amount of the screen data transmitted from the server 120 to the client 100. The amount of the screen data transmitted from the server 120 to the client 100 is reduced, so that the number of times that can transmit the packet of the operation data from the input device 140 connected to the client 100 increases. Therefore, it is possible to increase chances to receive the operation data from the input device 140 connected to the client 100.

Since the internal setting and changing communication unit 1317 sets the value of the permissible band on the network 130 and the thinning-out method of the screen data of the changing area used for the data transmission to the client 100, it is possible to adjust the amount of the screen data transmitted from the server 120 to the client 100. Moreover, it is possible to adjust the increase and decrease of chances to receive the operation data from the input device 140 connected to the client 100.

By using the communication band on the network 130 other than the value of the permissible band on the network 130 set by the internal setting and changing communication unit 1317, the communication unit 1316 receives the operation data from the input device 140 connected to the client 100, and the input device processing unit 1313 transmits the operation data to the server 120. Therefore, it is possible to execute the data communication between the client and the server efficiently.

The universal memory 1315 temporarily stores the data of the part thinned-out by the controlling unit 1314, and the communication unit 1316 transmits the screen data of the changing area after the thinning-out to the client 120 and then transmits the temporarily stored data of the thinned-out part to the client 120. Therefore, all the screen data of the changing area can be transmitted, and displayed on the monitor 150.

The communication unit 1316 transmits the screen data of the changing area after the thinning-out, and the data showing the display position and the display size of the screen data (i.e., X-coordinate of the changing area, Y-coordinate of the changing area, the number of pieces of horizontal data of the changing area, and the number of pieces of vertical data of the changing area) on the monitor 150 to the client 100. Therefore, the client 100 can display the screen data of the changing area after the thinning-out on the monitor 150 at an appropriate position and size.

Although in the present embodiment, the KVM switch 110 thins out the screen data of the changing area and transmits the screen data of the changing area after the thinning-out to the client 100, the KVM switch 110 may thin out all of the screen data and transmit all of the screen data after the thinning-out to the client 100, as well as the changing area.

A recording medium on which the software program for realizing the functions of the KVM switch 110 is recorded may be supplied to the KVM switch 110, and the controlling unit 1314 may read and execute the program recorded on the recording medium. In this manner, the same effects as those of the above-described first and second embodiments can be achieved. The recording medium for providing the program may be a CD-ROM, a DVD, or a SD card, for example.

Alternatively, the KVM switch 110 may execute a software program for realizing the functions of the KVM switch 110, so as to achieve the same effects as those of the above-described embodiment.

It should be noted that the present invention is not limited to those embodiments, and various modifications may be made to them without departing from the scope of the invention.

The Present application is based on Japanese Patent Application No. 2007-219074 filed Aug. 24, 2007, the entire disclosure of which is hereby incorporated by reference.

What is claimed is:

1. A KVM switch connected to a server, and a client via a network, comprising:
   a signal processing portion that receives an analog image signal corresponding to screen data displayed on a display device of the client from the server, executes analog/digital conversion to the analog image signal, and stores a converted digital image signal as the screen data into a memory;
   a detecting portion that, when new screen data is stored into the memory, detects data corresponding to a changing part of the new screen data to screen data that has already been stored into the memory;
   a thinning-out portion that thins out the detected data corresponding to the changing part of the new screen data;
   a transmitting and receiving portion that transmits data corresponding to the changing part of the new screen data after the thinning-out to the client, and receives operation data from an input device connected to the client; and
   a setting portion that sets a value of a permissible band on the network used for data transmission to the client.

2. The KVM switch as claimed in claim 1, wherein the setting portion sets a thinning-out method of the data corresponding to the changing part of the new screen data, which are used for data transmission to the client.

3. The KVM switch as claimed in claim 2, wherein the thinning-out method of the data corresponding to the changing part of the new screen data includes an amount of the thinning-out and a thinning-out form of the data corresponding to the changing part of the new screen data.

4. The KVM switch as claimed in claim 3, wherein the thinning-out form is any one of a checkered pattern, a vertical stripe, and a horizontal stripe.

5. The KVM switch as claimed in claim 2, wherein the thinning-out portion controls a transmission interval of the data corresponding to the changing part of the new screen data so that a transfer rate of the data corresponding to the changing part of the new screen data is accommodated in the value of the permissible band on the network set by the setting portion.

6. The KVM switch as claimed in claim 2, wherein the thinning-out portion controls the thinning-out method of the data corresponding to the changing part of the new screen data so that a transfer rate of the data corresponding to the changing part of the new screen data is accommodated in the value of the permissible band on the network set by the setting portion.

7. The KVM switch as claimed in claim 2, wherein the transmitting and receiving portion includes a transmitting portion that receives the operation data from the input device connected to the client and transmits the operation data to the server, by using a communication band on the network other than the permissible band on the network set by the setting portion.

8. The KVM switch as claimed in claim 1, further comprising a storing portion that temporarily stores data of a part thinned-out by the thinning-out portion, wherein the transmitting and receiving portion transmits the data corresponding to the changing part after the thinning-out to the client, and then transmits the data of the thinned-out part stored into the storing portion to the client.

9. The KVM switch as claimed in claim 1, wherein the transmitting and receiving portion transmits to the client the data corresponding to the changing part after the thinning-out, and information showing a display position and a display size on the display device of the data corresponding to the changing part after the thinning-out, and a thinning-out form and an amount of the thinning-out of the data corresponding to the changing part after the thinning-out.

10. The KVM switch as claimed in claim 1, wherein the signal processing portion receives the analog image signal corresponding to screen data displayed on the display device of the client from the server, thins out the received analog image signal based on predesignated thinning-out information, executes analog/digital conversion to the thinned-out analog image signal, and stores a thinned-out and converted digital image signal as the screen data into the memory, and
   the transmitting and receiving portion transmits the screen data stored into the memory to the client.

11. A method for controlling a KVM switch connected to a server, and a client via a network, comprising:
   receiving an analog image signal corresponding to screen data displayed on a display device of the client from the server, executing analog/digital conversion to the analog image signal, and storing a converted digital image signal as the screen data into a memory;

when new screen data is stored into the memory, detecting data corresponding to a changing part of the new screen data to screen data that has already been stored into the memory;

thinning-out the detected data corresponding to the changing part of the new screen data;

transmitting data corresponding to the changing part of the new screen data after the thinning-out to the client, and receiving operation data from an input device connected to the client; and setting a value of a permissible band on the network used for data transmission to the client.

12. The method for controlling the KVM switch as claimed in claim 11, wherein the setting sets a thinning-out method of the data corresponding to the changing part of the new screen data used for data transmission to the client.

13. The method for controlling the KVM switch as claimed in claim 12, wherein the thinning-out method of the data corresponding to the changing part of the new screen data includes an amount of the thinning-out and a thinning-out form of the data corresponding to the changing part of the new screen data.

14. The method for controlling the KVM switch as claimed in claim 13, wherein the thinning-out form is any one of a checkered pattern, a vertical stripe, and a horizontal stripe.

15. The method for controlling the KVM switch as claimed in claim 12, wherein the thinning-out controls a transmission interval of the data corresponding to the changing part of the new screen data so that a transfer rate of the data corresponding to the changing part of the new screen data is accommodated in the value of the permissible band on the network set in the setting.

16. The method for controlling the KVM switch as claimed in claim 12, wherein the thinning-out controls the thinning-out method of the data corresponding to the changing part of the new screen data so that a transfer rate of the data corresponding to the changing part of the new screen data is accommodated in the value of the permissible band on the network set in the setting.

17. The method for controlling the KVM switch as claimed in claim 12, wherein the transmitting and receiving includes transmitting that receives the operation data from the input device connected to the client and transmits the operation data to the server, by using a communication band on the network other than the permissible band on the network set in the setting.

18. The method for controlling the KVM switch as claimed in claim 11, further comprising temporarily storing data of a part thinned-out in the thinning-out into the memory, wherein the transmitting and receiving transmits the data corresponding to the changing part after the thinning-out to the client, and then transmits the data of the thinned-out part stored into the memory to the client.

19. The method for controlling the KVM switch as claimed in claim 11, wherein the transmitting and receiving transmits to the client the data corresponding to the changing part after the thinning-out, and information showing a display position and a display size on the display device of the data corresponding to the changing part after the thinning-out, and a thinning-out form and an amount of the thinning-out of the data corresponding to the changing part after the thinning-out.

20. The method for controlling the KVM switch as claimed in claim 11, wherein the signal processing receives the analog image signal corresponding to screen data displayed on the display device of the client from the server, thins out the received analog image signal based on predesignated thinning-out information, executes analog/digital conversion to the thinned-out analog image signal, and stores a thinned-out and converted digital image signal as the screen data into the memory, and the transmitting and receiving transmits the screen data stored into the memory to the client.

* * * * *